US008770181B2

(12) United States Patent
Best

(10) Patent No.: US 8,770,181 B2
(45) Date of Patent: Jul. 8, 2014

(54) METHODS AND APPARATUS FOR GENERATING INFRARED RADIATION FROM CONVECTIVE PRODUCTS OF COMBUSTION

(75) Inventor: Willie H. Best, Columbia, SC (US)

(73) Assignee: Char-Broil, LLC, Columbus, GA (US)

(*) Notice: Subject to any disclaimer, the term of this patent is extended or adjusted under 35 U.S.C. 154(b) by 1446 days.

(21) Appl. No.: 12/378,689

(22) Filed: Feb. 18, 2009

(65) Prior Publication Data
US 2009/0202688 A1 Aug. 13, 2009

Related U.S. Application Data

(63) Continuation-in-part of application No. 11/903,818, filed on Sep. 25, 2007, now Pat. No. 8,074,634, and a continuation-in-part of application No. 11/983,375, filed on Nov. 8, 2007, now Pat. No. 8,227,728.

(60) Provisional application No. 60/847,281, filed on Sep. 26, 2006, provisional application No. 60/858,152, filed on Nov. 10, 2006, provisional application No. 61/200,554, filed on Dec. 1, 2008.

(51) Int. Cl.
A47J 37/00 (2006.01)
F24C 3/04 (2006.01)

(52) U.S. Cl.
USPC ......... 126/41 R; 126/39 R; 126/19 R; 126/14

(58) Field of Classification Search
USPC ......... 126/41 R, 1 R, 39 R, 41 A–41 E, 39 C, 126/19 R, 14
See application file for complete search history.

(56) References Cited

U.S. PATENT DOCUMENTS 1,399,704 A 12/1921 Eida
3,155,814 A 11/1964 Appleman et al.
(Continued)

FOREIGN PATENT DOCUMENTS

DE 102 15 688 A1 11/2003
EP 0 221 686 A1 5/1987
(Continued)

OTHER PUBLICATIONS

Char-Broil, LLC, "First Day of Spring Signals Start of Grilling Season and Availability of Superior Cooking Technology—Char-Broil Expands Line of Award-Winning Infrared Products for 2008", www.charbroil.com/Consumer/NewsRoom.aspx, Mar. 18, 2008, pp. 1-2.

(Continued)

Primary Examiner — Linda Dvorak
Assistant Examiner — Kaitlyn Smith
(74) Attorney, Agent, or Firm — Dennis D. Brown; Brown Patent Law, P.L.L.C.

(57) ABSTRACT

An infrared emitter at least partially defines an interior space that at least partially contains convective products of combustion. A burner provides a mixture of combustible gas and primary air to the combustion, while secondary air is also provided to the combustion. A first side of the infrared emitter is in opposing face-to-face relation with the interior space so that the first side of the infrared emitter is exposed to, and heated by, the convective products of combustion. As a result, a second side of the infrared emitter emits infrared radiation. Static gauge pressure, measured at a location that is within the interior space and adjacent to the first side of the infrared emitter, may not exceed about 0.009 inches water column while the burner is operating. Excess air present in gasses exhausted from the interior space may be less than 300% while the burner is operating.

16 Claims, 16 Drawing Sheets

(56) References Cited

U.S. PATENT DOCUMENTS

| | | | |
|---|---|---|---|
| 3,245,458 A | 4/1966 | Patrick et al. | |
| 3,277,948 A | 10/1966 | Best | |
| 3,437,415 A | 4/1969 | Davis et al. | |
| 3,561,902 A | 2/1971 | Best | |
| 3,586,825 A | 6/1971 | Hurley | |
| 3,646,927 A * | 3/1972 | Perl | 126/39 J |
| 3,663,798 A | 5/1972 | Speidel et al. | |
| 3,683,058 A | 8/1972 | Partiot | |
| 3,941,117 A | 3/1976 | Pei et al. | |
| 4,024,839 A | 5/1977 | Reid, Jr. et al. | |
| 4,039,275 A | 8/1977 | McGettrick | |
| 4,057,670 A | 11/1977 | Scheidler | |
| 4,140,100 A | 2/1979 | Ishihara | |
| 4,207,456 A | 6/1980 | Best | |
| 4,235,023 A | 11/1980 | Best | |
| 4,276,869 A | 7/1981 | Kern | |
| 4,321,857 A | 3/1982 | Best | |
| 4,375,802 A | 3/1983 | Wallasvaara | |
| 4,403,597 A | 9/1983 | Miller | |
| 4,426,792 A | 1/1984 | Best | |
| 4,437,833 A | 3/1984 | Mertz | |
| 4,508,097 A | 4/1985 | Berg | |
| 4,537,492 A | 8/1985 | Lein et al. | |
| 4,546,553 A | 10/1985 | Best | |
| 4,569,657 A | 2/1986 | Laspeyres | |
| 4,575,616 A | 3/1986 | Bergendal | |
| 4,606,261 A | 8/1986 | Bernardi | |
| 4,715,356 A * | 12/1987 | Reynolds | 126/39 H |
| 4,785,552 A | 11/1988 | Best | |
| 4,798,192 A | 1/1989 | Maruko | |
| 4,839,502 A | 6/1989 | Swanson et al. | |
| 4,883,423 A | 11/1989 | Holowczenko | |
| 4,886,044 A | 12/1989 | Best | |
| 4,909,137 A | 3/1990 | Brugnoli | |
| 5,024,209 A | 6/1991 | Schaupert | |
| 5,028,760 A | 7/1991 | Okuyama | |
| 5,062,408 A | 11/1991 | Smith et al. | |
| 5,062,788 A * | 11/1991 | Best | 431/7 |
| 5,105,725 A | 4/1992 | Haglund | |
| 5,111,803 A | 5/1992 | Barker et al. | |
| 5,218,952 A | 6/1993 | Neufeldt | |
| 5,230,161 A | 7/1993 | Best | |
| 5,240,411 A | 8/1993 | Abalos | |
| 5,277,106 A | 1/1994 | Raymer et al. | |
| 5,279,277 A | 1/1994 | Barker | |
| 5,306,138 A * | 4/1994 | Best | 431/5 |
| 5,313,877 A | 5/1994 | Holland | |
| 5,363,567 A * | 11/1994 | Best | 34/271 |
| 5,488,897 A | 2/1996 | Snyder | |
| 5,494,003 A * | 2/1996 | Bartz et al. | 122/18.31 |
| 5,509,403 A | 4/1996 | Kahlke et al. | |
| 5,513,623 A | 5/1996 | Hong | |
| 5,566,607 A | 10/1996 | Schleimer | |
| 5,567,459 A | 10/1996 | Gonzalez-Hernandez et al. | |
| 5,571,009 A | 11/1996 | Stålhane et al. | |
| 5,582,094 A | 12/1996 | Peterson et al. | |
| 5,594,999 A | 1/1997 | Best | |
| 5,632,236 A * | 5/1997 | Joyce | 126/104 A |
| 5,676,043 A | 10/1997 | Best | |
| 5,711,661 A | 1/1998 | Kushch et al. | |
| 5,761,990 A | 6/1998 | Stewart et al. | |
| 5,782,166 A | 7/1998 | Lin | |
| 5,823,099 A | 10/1998 | Ko | |
| 5,879,154 A | 3/1999 | Suchovsky | |
| 5,890,422 A | 4/1999 | Clark et al. | |
| 5,989,013 A | 11/1999 | Gray | |
| 6,114,666 A | 9/2000 | Best | |
| 6,159,001 A | 12/2000 | Kushch et al. | |
| 6,190,162 B1 | 2/2001 | Smith et al. | |
| 6,205,996 B1 | 3/2001 | Ryan | |
| 6,371,011 B1 | 4/2002 | Kuechler | |
| 6,461,150 B1 | 10/2002 | Sirand | |
| 6,657,168 B1 | 12/2003 | Lazzer | |
| 6,779,519 B2 * | 8/2004 | Harneit | 126/41 R |
| 6,783,226 B2 | 8/2004 | Szlucha | |
| 7,202,447 B2 | 4/2007 | Kingdon et al. | |
| 8,074,634 B2 * | 12/2011 | Best | 126/25 R |
| 2001/0036610 A1 | 11/2001 | Wood | |
| 2002/0011244 A1 * | 1/2002 | Giebel et al. | 126/41 R |
| 2002/0020405 A1 | 2/2002 | Coleman et al. | |
| 2004/0011350 A1 * | 1/2004 | Dowst et al. | 126/344 |
| 2004/0060552 A1 * | 4/2004 | Yamada et al. | 126/39 K |
| 2004/0152028 A1 | 8/2004 | Singh et al. | |
| 2004/0250688 A1 | 12/2004 | Farkas et al. | |
| 2005/0226976 A1 | 10/2005 | Chung | |
| 2006/0003279 A1 * | 1/2006 | Best | 431/328 |
| 2006/0021517 A1 | 2/2006 | Best | |
| 2006/0266979 A1 | 11/2006 | Ra | |
| 2007/0125357 A1 | 6/2007 | Johnston | |
| 2008/0072890 A1 * | 3/2008 | Best | 126/25 R |
| 2008/0121117 A1 | 5/2008 | Best | |
| 2009/0165774 A1 | 7/2009 | Johnston et al. | |
| 2009/0308374 A1 | 12/2009 | Ahmed | |
| 2010/0095951 A1 | 4/2010 | Ahmed | |

FOREIGN PATENT DOCUMENTS

| | | |
|---|---|---|
| EP | 1 028 292 | 8/2000 |
| EP | 1 096 203 A1 | 5/2001 |
| EP | 1 886 606 A1 | 2/2008 |
| EP | 1 776 028 B1 | 10/2008 |
| FR | 1 129 123 | 1/1957 |
| FR | 1 204 968 | 1/1960 |
| FR | 1 387 132 | 1/1965 |
| FR | 2 076 610 | 10/1971 |
| FR | 2 472 141 | 6/1981 |
| GB | 23552 | 0/1915 |
| GB | 432 481 | 7/1935 |
| GB | 562 136 | 6/1944 |
| GB | 576 377 | 4/1946 |
| GB | 1 029 774 | 5/1966 |
| GB | 1 339 345 | 12/1973 |
| GB | 2 362 451 A | 11/2001 |
| GB | 2 409 265 A | 6/2005 |
| JP | 2000 121064 | 4/2000 |
| JP | 2004 179089 | 6/2004 |
| WO | WO 0001286 | 1/2000 |
| WO | WO 2004/103133 | 12/2004 |
| WO | WO 2008/060443 A2 | 5/2008 |
| WO | WO 2008/125258 | 10/2008 |
| WO | WO 2008125258 A2 | 10/2008 |

OTHER PUBLICATIONS

Char-Broil, LLC, "The Big Easy from Char-Broil Receives Home, Hearth, Patio Association Vesta Award for technology and innovation", www.charbroil.com/Consumer/NewsRoom.aspx, Mar. 1, 2008, pp. 1-2.

Char-Broil, LLC, "The Big Easy from Char-Broil Receives UL Mark", www.charbroil.com/Consumer/NewsRoom.aspx, Feb. 25, 2008, pp. 1-2.

Char-Broil, LLC, "Char-Broil RED Launches at The Home Depot—InfraRED Grilling that's All About U", www.charbroil.com/Consumer/NewsRoom.aspx, Feb. 21, 2008, p. 1.

Char-Broil, LLC, "Char-Broil Quantum, Infrared Grilling Made Easy", www.charbroil.com/Consumer/NewsRoom.aspx, Feb. 21, 2008, p. 1.

Char-Broil, LLC, "Char-Broil Expands Line of Infrared Products for 2008—Infrared collection includes new designs, additional price points", www.charbroil.com/Consumer/NewsRoom.aspx, Feb. 21, 2008, pp. 1-3.

Char-Broil, LLC, "Char-Broil Defines Infrared and Heat Transfer", www.charbroil.com/Consumer/NewsRoom.aspx, Feb. 21, 2008, p. 1.

Char-Broil, LLC, "Char-Broil Defines Infrared Grilling—The future of grilling is here. Are you IN?", www.charbroil.com/Consumer/NewsRoom.aspx, Feb. 21, 2008, pp. 1-2.

Char-Broil, LLC, "Take the Easy Way Out This Thanksgiving—The Big Easy infrared turkey fryer from Char-Broil uses no oil, creates same great fried-turkey taste", www.charbroil.com/Consumer/NewsRoom.aspx, Sep. 23, 2007, pp. 1-2.

(56) References Cited

OTHER PUBLICATIONS

Char-Broil, LLC, "The Big Easy Oil-Less Turkey Fryer Product Guide—Model 08101480", http://www.charbroil.com/bps/char-broil/char-broil/knowledge/08101480%20english%20spanish_033a35d-2_.pdf, Sep. 5, 2008, pp. 1-18.
Char-Broil, LLC, "Model 463248208—Product Guide", http://www.charbroil.com/bps/char-broil/char-broil/knowledge/463248208%20english%20040208.pdf, Apr. 2, 2008, pp. 1-32.
Char-Broil, LLC, "Model 463272108—Product Guide", http://www.charbroil.com/bps/char-broil/char-broil/knowledge/463272108%20english%20032008.pdf, Mar. 20, 2008, pp. 1-32.
Char-Broil, LLC, "Model 463248708—Product Guide", http://www.charbroil.com/bps/char-broil/char-broil/knowledge/463248708%20english%20032708.pdf, Mar. 27, 2008, pp. 1-32.
Char-Broil, LLC, "Model 463270909—Product Guide", http://www.charbroil.com/bps/char-broil/char-broil/knowledge/463270909%20english.pdf, Sep. 2, 2008, pp. 1-28.
Char-Broil, LLC, "Model 463271309—Product Guide", http://www.charbroil.com/bps/char-broil/char-broil/knowledge/463271309%20english.pdf, Oct. 7, 2008, pp. 1-32.
Char-Broil, LLC, "Model 463271509—Product Guide", http://www.charbroil.com/bps/char-broil/char-broil/knowledge/463271509%20english.pdf, Oct. 7, 2008, pp. 1-36.
Char-Broil, LLC, "Model 463246909—Product Guide", http://www.charbroil.com/bps/char-broil/char-broil/knowledge/463246909%20english.pdf, Dec. 3, 2008, pp. 1-28.
Char-Broil, LLC, "Model 463250308—Product Guide", http://www.charbroil.com/bps/char-broil/char-broil/knowledge/463250308%20english_d0b831ab-0_.pdf, May 18, 2008, pp. 1-32.
Char-Broil, LLC, "Model 463250108—Product Guide", http://www.charbroil.com/bps/char-broil/char-broil/knowledge/463250108%20english%20032008.pdf, May 20, 2008, pp. 1-28.
Char-Broil, LLC, "Model 463250709—Product Guide", http://www.charbroil.com/bps/char-broil/char-broil/knowledge/463250709%20english.pdf, Oct. 15, 2008, pp. 1-28.
Char-Broil, LLC, "Model 463250509—Product Guide", http://www.charbroil.com/bps/char-broil/char-broil/knowledge/463250509%20english.pdf, Sep. 9, 2008, pp. 1-28.
Char-Broil, LLC, "Model 463272509—Product Guide", http://www.charbroil.com/bps/char-broil/char-broil/knowledge/463272509%20english.pdf, Sep. 9, 2008, pp. 1-28.
Char-Broil, LLC, "Model 463268307—Product Guide", http://www.charbroil.com/bps/char-broil/char-broil/knowledge/80008832$_{13}$463268307_english[1].pdf, Oct. 13, 2006, pp. 1-28.
Char-Broil, LLC, "Model 463268507—Product Guide", http://www.charbroil.com/bps/char-broil/char-broil/knowledge/463268507_assembly%20manual.pdf, Jan. 16, 2007, pp. 1-28.
Char-Broil, LLC, "Assembly Instructions for Models 6320, 6321, & 6323", 1992, pp. 1-18.
P. Sheridan et al., "Application of far infra-red radiation to cooking of meat products", Journal of Food Engineering, 1999, pp. 203-208, vol. 41, Elsevier Science Ltd.
P.S. Sheridan et al., "Analysis of yield while cooking beefburger patties using far infrared radiation", Journal of Food Engineering, 2001, pp. 3-11, vol. 51, Elsevier Science Ltd.
N. Shilton et al., "Modeling of heat transfer and evaporative mass losses during the cooking of beef patties using far-infrared radiation", Journal of Food Engineering, 2002, pp. 217-222, vol. 55, No. 3, Elsevier Science Ltd. (Abstract Only).
N. C. Shilton et al., "Determination of the thermal diffusivity of ground beef patties under infrared radiation oven-shelf cooking", Journal of Food Engineering, Mar. 2002, pp. 39-45, vol. 52, No. 1 (Abstract Only).
Y. Takahashi et al., "Impact of IR Broiling on the Thiamin and Riboflavin Retention and Sensory Quality of Salmon Steaks for Foodservice Use", Journal of Food Science, 1987, pp. 4-6, vol. 52, No. 1 (Abstract Only).
P. Sheridan et al., "Application of far infra-red radiation to cooking of meat products", Journal of Food Engineering, 1999, pp. 203-208, vol. 41, No. 3/4, International Food Information Service (Abstract Only).
Cross Section of G3000 Cabinet Unit, Sep. 4, 2001, Thermal Engineering Corp., Columbia, South Carolina.
Cross Section of G-Series Burner System, Sep. 4, 2001, Thermal Engineering Corp., Columbia, South Carolina.
PCT/US2009/034403 International Search Report, "Methods and Apparatus for Generating Infrared Radiation From Convective Products of Combustion ", Nov. 20, 2009, Published in: PCT.
State of Intellectual Property Office of People's Republic China—Search Report; Dated Jun. 22, 2013.
Communication under Rule 71(3) EPC regarding European Application No. 09 789 469.5.
PCT/US2009/034403 Written Opinion of the International Searching Authority, "Methods and Apparatus for Generating Infrared Radiation From Convective Products of Combustion", Nov. 20, 2009; Published in: PCT.

* cited by examiner

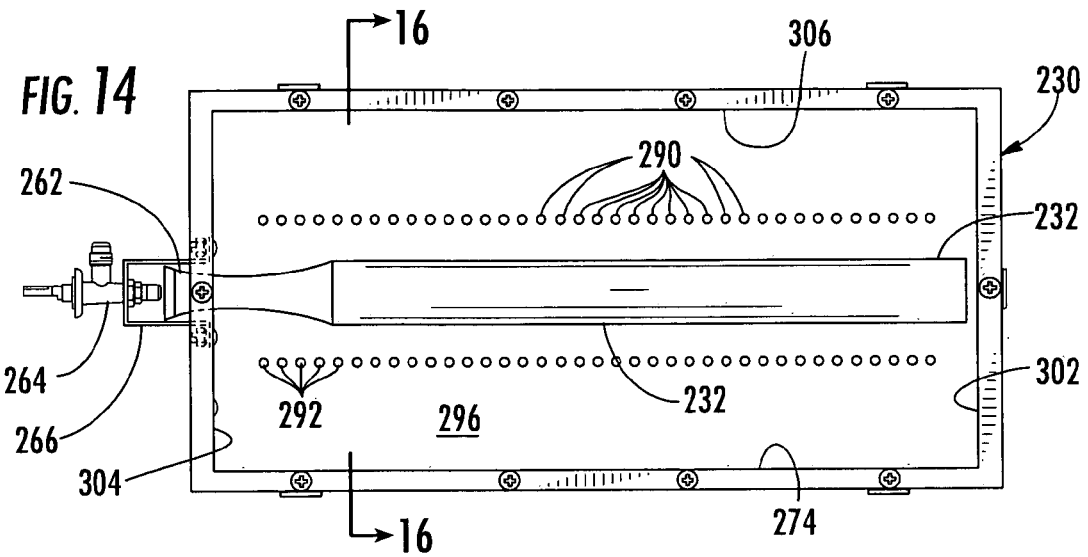
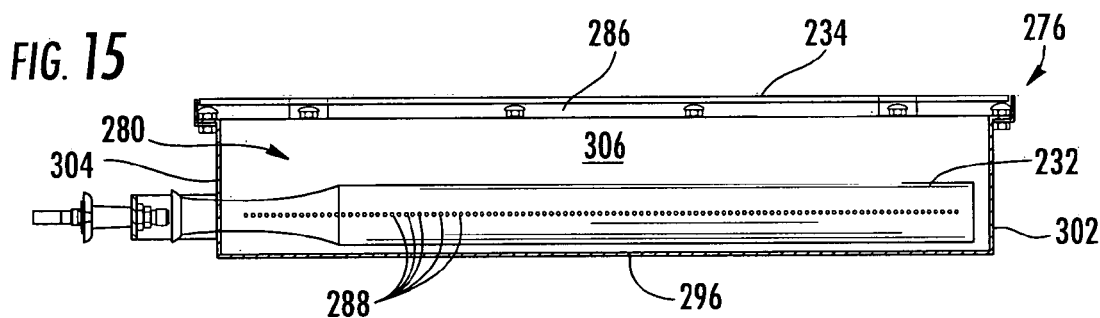
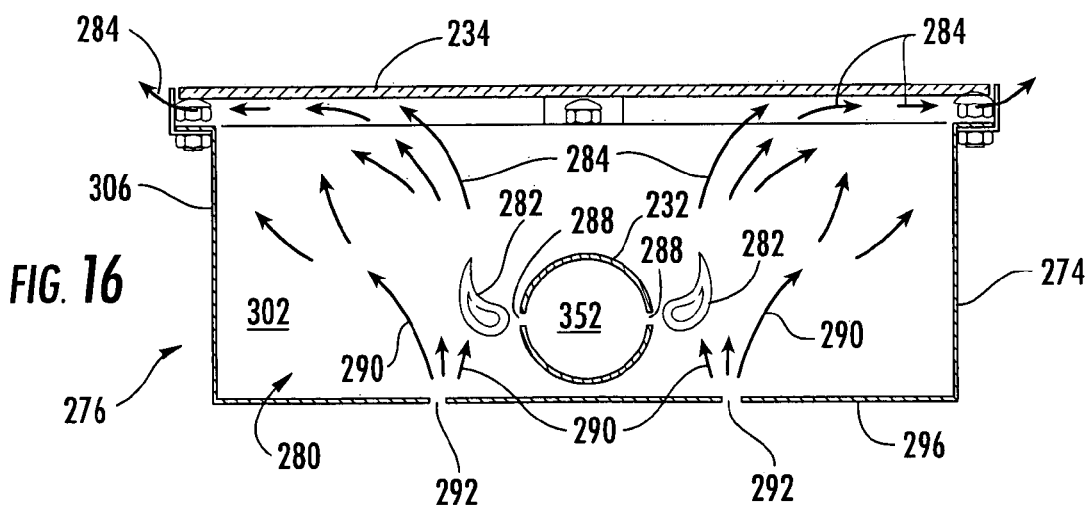

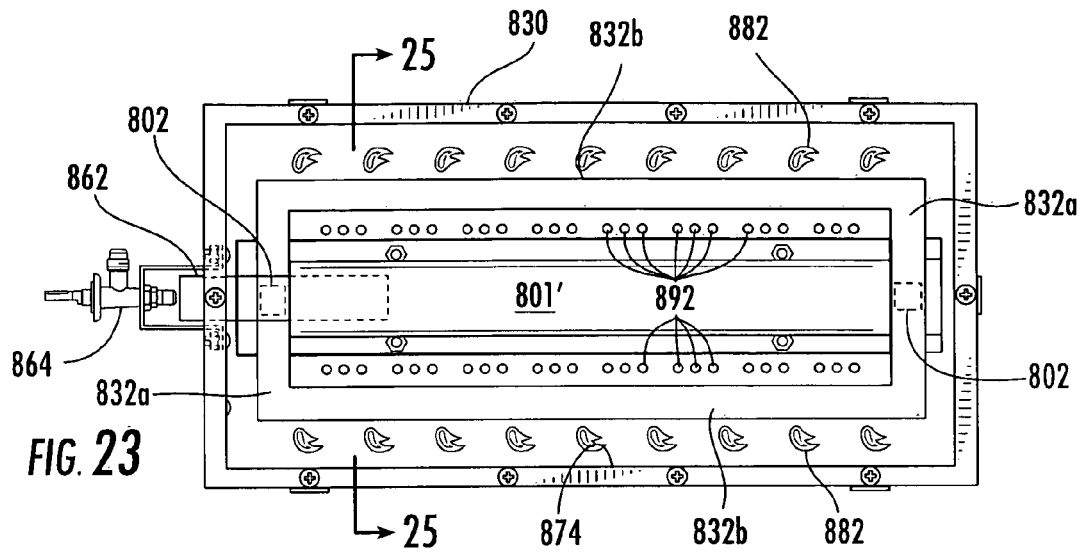
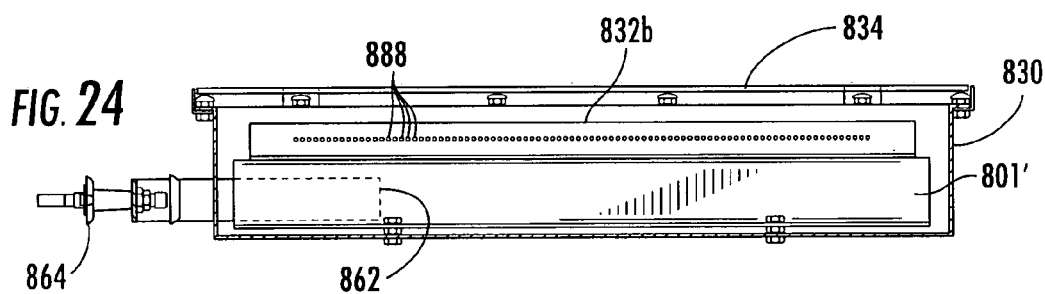
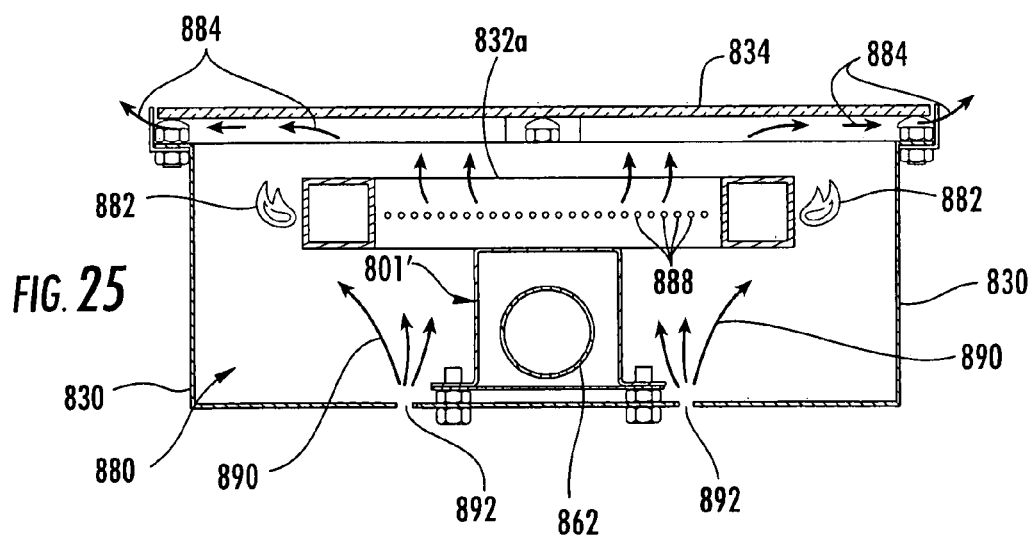

METHODS AND APPARATUS FOR GENERATING INFRARED RADIATION FROM CONVECTIVE PRODUCTS OF COMBUSTION

CROSS REFERENCE TO RELATED APPLICATIONS

The present application is a continuation-in-part of U.S. patent application Ser. No. 11/903,808, now U.S. Pat. No. 8,074,634, filed Sep. 25, 2007, which claims the benefit of U.S. Provisional Application No. 60/847,281, filed Sep. 26, 2006. The present application is a continuation-in-part of U.S. patent application Ser. No. 11/983,375, now U.S. Pat. No. 8,227,728, filed Nov. 8, 2007, which claims the benefit of U.S. Provisional Application No. 60/858,152, filed Nov. 10, 2006. The present application claims the benefit of U.S. Provisional Patent Application No. 61/200,554, filed Dec. 1, 2008. The entire disclosure of each of the above-referenced patent applications is incorporated herein by reference.

TECHNICAL FIELD

The present invention generally relates to radiant heaters and, more particularly, to grills and other cooking devices that cook with infrared radiant energy.

BACKGROUND

It is known to heat, dry and cook with infrared radiant energy. In particular, gas grills that cook with infrared radiant energy are well known. There is always a desire for burners and radiant heaters that provide a different balance of properties (e.g., are cost-effective to manufacture and efficient to operate).

SUMMARY OF SOME ASPECTS OF THIS DISCLOSURE

An aspect of this disclosure is the provision of methods and apparatus that use heated products of combustion from a port-type convection burner to heat a surface that is for generating infrared energy for broiling food.

Another aspect of this disclosure is the provision of an apparatus for creating combustion from a mixture of combustible gas, primary air and secondary air, and generating infrared radiation from the convective products of the combustion. The apparatus includes a chamber defining an interior space for at least partially containing the combustion, and a burner with ports that are open to the interior space. The burner is for supplying a mixture of the gas and primary air to the combustion in the interior space. The chamber includes at least one air intake (e.g., air intake ports) for allowing secondary air to flow into the interior space and be supplied to the combustion in the interior space. The chamber also includes an exhaust (e.g., exhaust ports) for exhausting the products of combustion from the interior space. The chamber comprises an infrared energy emitter that at least partially defines the interior space of the chamber. The infrared energy emitter is for being contacted by and heated by the convective products of combustion within the interior space, and for emitting infrared radiation. The infrared energy emitter may emit infrared radiation away from the chamber. For optimal performance and for example, the chamber may be configured to enhance mixing of the combustible gas and air without quenching the flames of the combustion, the provision of excess secondary air may be substantially restricted, and/or the pressure within the interior space of the chamber may be substantially the same as the pressure of the environment in which the chamber is located (e.g., ambient pressure).

One aspect of this disclosure comprises limiting and directing secondary air by using the chamber that encompasses the burner (or multiple segments of a burner with one air and fuel supply) to improve the efficiency and performance in converting convective energy to infrared energy. The chamber is typically configured in a spaced relationship with the burner so as to eliminate excess space or volume that would allow the secondary air to bypass the combustion process. The chamber may also be configured to restrict any quenching of the flames against the interior surfaces of the chamber.

In accordance with one aspect of this disclosure, the apparatus (e.g., the burner) is configured for operating at at least about 14 BTU/HR per cubic inch of the volume of the interior space of the chamber.

According to one aspect of this disclosure, the apparatus (e.g., the burner) is configured for operating at at least about 1000 BTU/HR per square inch of the exhaust area of the chamber.

In accordance with one aspect of this disclosure, the convective products of combustion that contact and heat the interior side of the infrared energy emitter may be at least about 100° F. hotter than the substantially stabilized operating temperature of the infrared energy emitter.

According to one aspect of this disclosure, at least one baffle may be positioned in the interior space of the chamber so that opposite sides of the baffle are for being exposed to, and heated by, the convective products of the combustion in the interior space of the chamber. The baffle(s) are configured for emitting infrared radiation toward the infrared energy emitter, for heating the infrared energy emitter.

The burner may be configured for causing a majority of the flames of the combustion to be spaced apart from the burner (e.g., the burner may be a port-type convection burner). The convection burner may have a good turndown ratio (e.g., a turndown ratio that is better than that of at least some conventional infrared burners, some of which may only have a turndown ratio of about 2.5 to 1).

Another aspect of this disclosure is the provision of a burner that is operative for restricting flashback and/or operative for advantageously distributing the flames, and the burner may be used in a wide variety of applications (e.g., applications other than those in which infrared radiation is generated from the convective products of the combustion).

Other aspects and advantages of the present invention will become apparent from the following.

BRIEF DESCRIPTION OF THE DRAWINGS

Having described some aspects of this disclosure in general terms, reference will now be made to the accompanying drawings, which are not necessarily drawn to scale and are briefly described below.

FIG. 14 is a schematic, isolated, top plan view of a burner assembly, in accordance with a second embodiment of this disclosure.

FIG. 15 is a schematic, partially cutaway, front elevation view of a compound heater, in accordance with the second embodiment.

FIG. 16 is a schematic cross-sectional view of the compound heater of the second embodiment, with the cross-section taken substantially along line 16-16 in FIG. 14.

FIG. 23 is a schematic, isolated, top plan view of a burner assembly, in accordance with a sixth embodiment of this disclosure.

FIG. 24 is a schematic, partially cutaway, front elevation view of a compound heater of the sixth embodiment.

FIG. 25 is a schematic cross-sectional view of the compound heater of the sixth embodiment, with the cross-section taken substantially along line 25-25 in FIG. 23.

DETAILED DESCRIPTION

Referring now in greater detail to the drawings, in which like numerals refer to like parts throughout the several views, several exemplary embodiments are disclosed.

Figure 1:
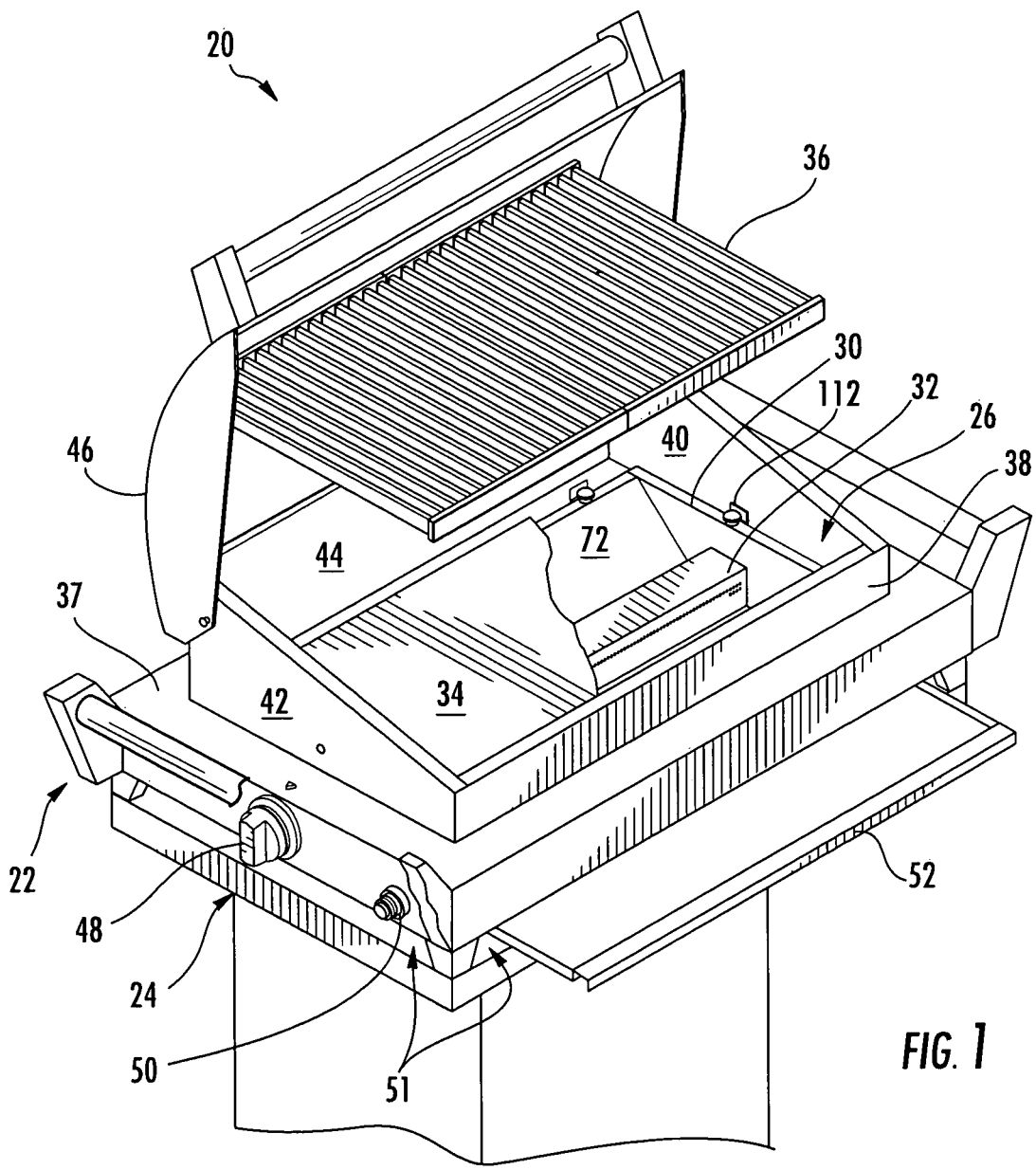
FIG. 1 is a schematic, partially exploded, partially cutaway, pictorial view of a grill, in accordance with a first embodiment of this disclosure.

FIG. 1 is a partially exploded, partially cutaway, pictorial view of a grill 20 that is described in the following in accordance with a first embodiment of this disclosure. The grill 20 includes an upper housing 22 that is supported by a pedestal 24. The housing 22 of the grill 20 forms an upwardly open container (e.g., cavity) for at least partially containing components that are discussed in greater detail below primarily with reference to the figures following FIG. 1. The upwardly open container formed by the housing 22 of the grill 20 may be generally referred to as an outer container 26. As may be generally understood with reference to FIG. 1, the grill's outer container 26 at least partially contains a burner housing 30 that is mounted to the housing 22 of the grill 20, a burner 32 contained by and mounted to the burner housing, an emitter plate 34 supported by and positioned above the burner housing, and cooking grids 36 positioned above and supported by the emitter plate. The emitter plate 34 is partially cut away in FIG. 1, and the cooking grids 36 are shown exploded upwardly away from the emitter plate. The lower surfaces of the cooking grids 36 typically sit upon, or are otherwise in substantially close proximity to, the upper surface of the emitter plate 34, for example as described in U.S. Patent Application Publication No. 2006/0021517, the entire disclosure of which is incorporated herein by reference. Alternatively, the lower surfaces of the cooking grids 36 may be spaced apart from the emitter plate 34 so that the cooking grids do not sit upon, and are spaced apart from, the upper surface of the emitter plate 34.

More specifically regarding the grill's housing 22, it includes a frame 37 that at least partially forms the grill's outer container 26. The grill's housing 22 also includes front, right, left and rear walls 38, 40, 42, 44 that extend upwardly from an upper surface of the frame 37. The upright walls 38, 40, 42, 44 together extend around (e.g., define) the upper opening of the grill's outer container 26. The upright walls 38, 40, 42, 44 are arranged in a manner such that they may shield the upper opening of the grill's outer container 26 from at least some wind. For ease of understanding, the upright walls 38, 40, 42, 44 are respectively referred to as front, right, left and rear walls to define a frame of reference that is frequently used throughout this detailed description section of this disclosure. However, the present invention is not limited to any particular frame of reference. For example, the grill 20 may be round or any other suitable shape, and components of the grill may be used in a variety of different orientations, combinations and subcombinations.

The grill 20 typically further includes a hood 46 that is pivotably mounted to housing 22 (e.g., pivotably mounted to the right and left upright walls 40, 42) for opening and closing the upper opening of the grill's outer container 26. In many situations, the hood 46 may be omitted. As shown in FIG. 1, the hood 46 includes a front handle for use in opening and closing the hood. Handles may also be provided at the right and left ends or the frame 37, or at any other suitable location. In FIG. 1, the handle at the left end of the frame 37 is partially cut away to show a manual control knob 48 and a push button portion of an igniter 50. The control knob 48 may be used in the adjustment of the supply of gas/a gas-air mixture to the burner 32, and the igniter 50 may be used to ignite the gas-air mixture exiting the burner, as will be discussed in greater detail below.

A lower portion of the pedestal 24 is cut away in FIG. 1. The pedestal 24 may be in the form of a cabinet that is mounted to a base (not shown) supported by casters/wheels (not shown). When the pedestal 24 is in the form of a cabinet, an interior of the cabinet may contain a propane tank (not shown), unless another source of combustible gas is used. The interior of the cabinet may be accessed by way of door (not shown) pivotably mounted to the cabinet. The interior of the cabinet may be ventilated by way of vents (not shown).

The grill's housing 22/frame 37 is typically configured so that the grill's outer container 26 is at least partially downwardly open and in fluid communication with the ambient environment, such as by way of gaps 51 between the housing 22 and the pedestal 24, vents in the pedestal, and/or any other suitable passageways. The grill 20 may include a retractable tray 52 that may be mounted between the housing 22 and the pedestal 24, such as in the front gap 51 or in a rear gap between the housing 22 and the pedestal 24. The tray 52 is typically configured for at least partially obstructing the lower opening of the grill's outer container 26. The tray 52 is shown partially retracted/extended in FIG. 1, and it may be manually substantially fully retracted into (e.g., pushed into) the front gap 51 for collecting any small items (e.g., cooking residue, such as small particles that may be charred remains of food being cooked and/or ash) that fall over the edges of the emitter plate 34. The tray 52 may be manually removed from the front gap 51 in order to dump out the contents of the tray.

The housing 22 and the pedestal 24 can be any suitable type of housing, frame, or the like. For example, the housing 22 and the pedestal 24, like many other parts of the grill 20, may be made of stainless steel or any other suitable material. It is to be understood that, throughout this disclosure, one or more of the components described may be modified or omitted (e.g., the pedestal 24 may be omitted). Also, other features may be included. For example, the grill 20 may also include one or more shelves (not shown).

Figure 2:
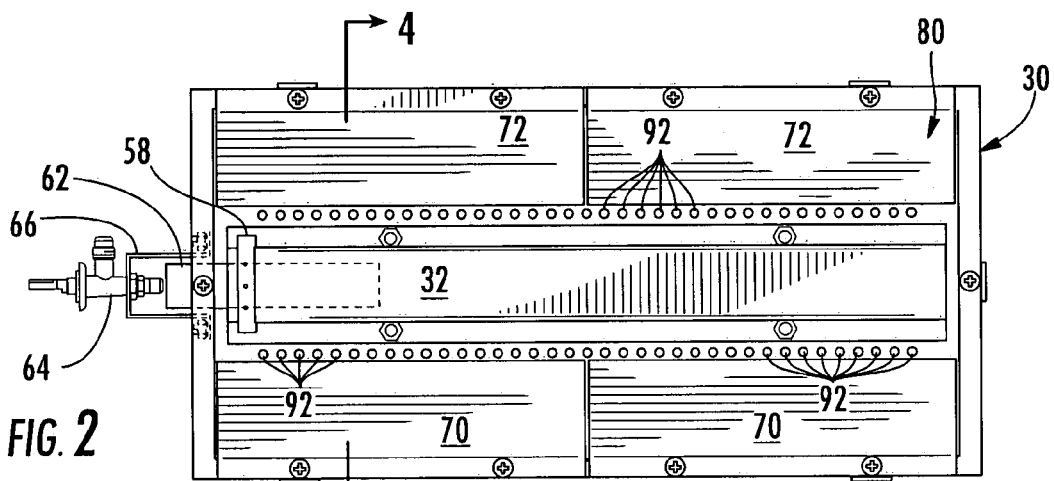
FIG. 2 is a schematic, isolated, top plan view of a burner assembly of the grill of FIG. 1.

FIG. 2 is a schematic, isolated, top plan view of a burner assembly that includes the burner housing 30, the burner 32, a crossover channel 58, a tubular air injector 62 (e.g., venturi tube) and a control valve 64 mounted to the burner housing by way of a mounting bracket 66. A supply of combustible gas (e.g., propane, natural gas, or any other suitable gas) is supplied to the control valve 64 by way of a supply pipe or tube (not shown), and the control valve 64 is operated by way of the control knob 48 (FIG. 1) so that the combustible gas and primary air are supplied to the interior of the burner 32 by way of the air injector 62. In FIG. 2, dashed lines schematically illustrate the hidden portion of the air injector 62 extending into the burner 32. As will be discussed in greater detail below, the burner housing 30 is in the form of a container that includes a front wall 74 (FIG. 4) and contains front and rear baffles 70, 72.

Figure 3:
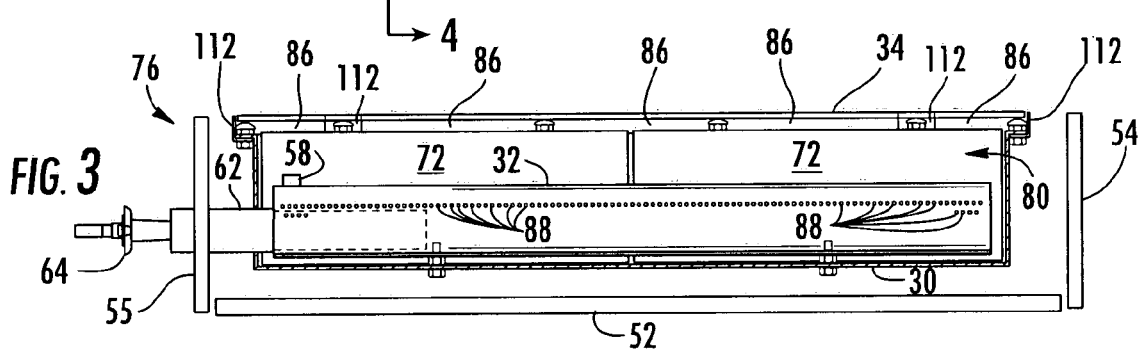
FIG. 3 is a schematic, partially cutaway, front elevation view of a compound heater of the grill of FIG. 1.

FIG. 3 is a schematic, partially cutaway, front elevation view of the burner assembly (which includes the burner housing 30, burner 32, air injector 62 and control valve 64) in combination with the emitter plate 34. In FIG. 3, the front baffles 70 (FIGS. 2 and 4) and the front wall 74 (FIG. 4) of the burner housing 30, as well as any associated insulation 75 (FIG. 4), are cut away to show the burner 32 within the burner housing. Whereas the tray 52 and a portion of the grill's housing 22 are schematically shown in FIG. 3 (i.e., interior right and left walls 54, 55 of the grill's housing 22 are schematically shown), the rest of the grill's housing is not shown in FIG. 3 in order to show the burner housing 30 and the burner 32. The burner housing 30 is typically mounted within the grill's outer container 26 by way of brackets and/or cross members (not shown) that are mounted to the walls or other frame parts of the grill's housing 22.

Dashed lines schematically illustrate the hidden portion of the air injector 62 extending into the burner 32 in FIG. 3. As will be discussed in greater detail below, the burner assembly (which includes the burner housing 30, burner 32, air injector 62 and control valve 64) and the emitter plate 34 operate together to form a compound heater 76 for converting convective products of combustion to infrared radiation. As will be discussed in greater detail below, the infrared radiation provided by the emitter plate 34 may be used for a variety of purposes such as, but not limited to, heating (e.g., cooking) an article (e.g., food). Whereas the compound heater 76 is shown and described herein as being part of the grill 20, the compound heater is not required to be incorporated into a grill and can be used in a variety of different applications.

Figure 4:
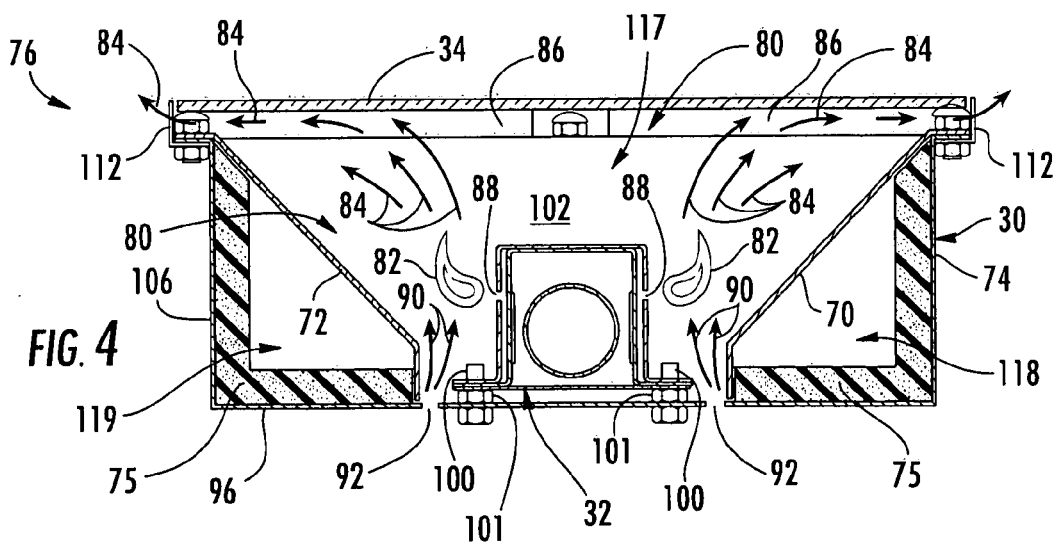
FIG. 4 is a schematic, cross-sectional view of the compound heater, with the cross-section taken substantially along line 4-4 in FIG. 2.

FIG. 4 is a schematic cross-sectional view of the compound heater 76, with the cross-section taken substantially along line 4-4 in FIG. 2. The emitter plate 34 together with the burner housing 30 forms a chamber (e.g., combustion chamber 80) of the compound heater 76. That is, the emitter plate 34 and the walls 74, 96, 102, 104, 106 (also see FIG. 5) of the burner housing 30 are the walls of the combustion chamber 80. Operation of the compound heater 76 is briefly discussed in the following, followed firstly by a more detailed description of the structure of the compound heater, and secondly by a more detailed description of the operation of the compound heater.

The combustion chamber 80, or more specifically the combustion chamber's interior space, is for containing products of combustion, which are schematically shown in FIG. 4. The products of combustion include flames 82 and convective products of the combustion that are downstream from (e.g., above) the flames. In FIG. 4, some of the convective products of combustion are schematically represented by arrows 84 that are downstream from the flames 82. Only a few of the convective products of combustion/arrows 84 are identified with their reference numeral in FIG. 4 in an effort to clarify the view. The convective products of combustion 84 exit the combustion chamber 80 by way of exhaust ports 86 of the combustion chamber. A mixture of combustible gas and primary air is supplied to the flames 82 from at least two elongate series of discharge ports 88 of the burner 32. Only a few of the discharge ports 88 are identified with their reference numeral in some of the figures in an effort to clarify the views. In accordance with one aspect of this disclosure, the burner 32 is in fluid communication with the interior space of the combustion chamber 80 (e.g., the burner 32 is positioned in the interior space of the combustion chamber 80) for providing the mixture of the combustible gas and the primary air (e.g., a gas-air mixture) to the combustion (e.g., flames 82).

In FIG. 4, secondary air that supports the combustion is schematically represented by the arrows 90 that are upstream from (e.g., below) the flames 82. The secondary air 90 enters the interior of the combustion chamber 80 by way of an air intake that may be in the form of at least two elongate series of intake ports 92 of the combustion chamber 80. Only a few of the intake ports 92 and some of the secondary air 90 are identified with their reference numeral in some of the figures in an effort to clarify the views.

In accordance with the first embodiment, the compound heater 76 together with the cooking grids 36 (FIG. 1), which are positioned above and supported by the emitter plate 34, forms a cooking apparatus for cooking (e.g., broiling) food (not shown) that is supported by and positioned above the cooking grids. The emitter plate 34 is an infrared energy emitter that is heated by the products of combustion (e.g., contacted by the convective products of combustion 84) that are within the interior of the combustion chamber 80. In response to being heated by the products of combustion, the upper surface of the emitter plate 34 emits infrared radiation away from the combustion chamber 80 and toward the food that is supported by and positioned above the cooking grids 36. That is and in accordance with the first embodiment, the upper surface of the emitter plate 34 is in opposing face-to-face relationship with (e.g., opposing face-to-face contact with) and emits infrared radiant energy toward the cooking grids 36. The cooking grids 36 can be replaced with a single cooking grid, more than two cooking grids, a rotisserie mechanism, or any other type of support member for supporting the food to be cooked. Alternatively, a mechanism for supporting food may be omitted, and the compound heater 76 may be used for a variety of purposes other than for cooking food, such as, but not limited to, drying coatings (e.g., paint).

Figure 5:
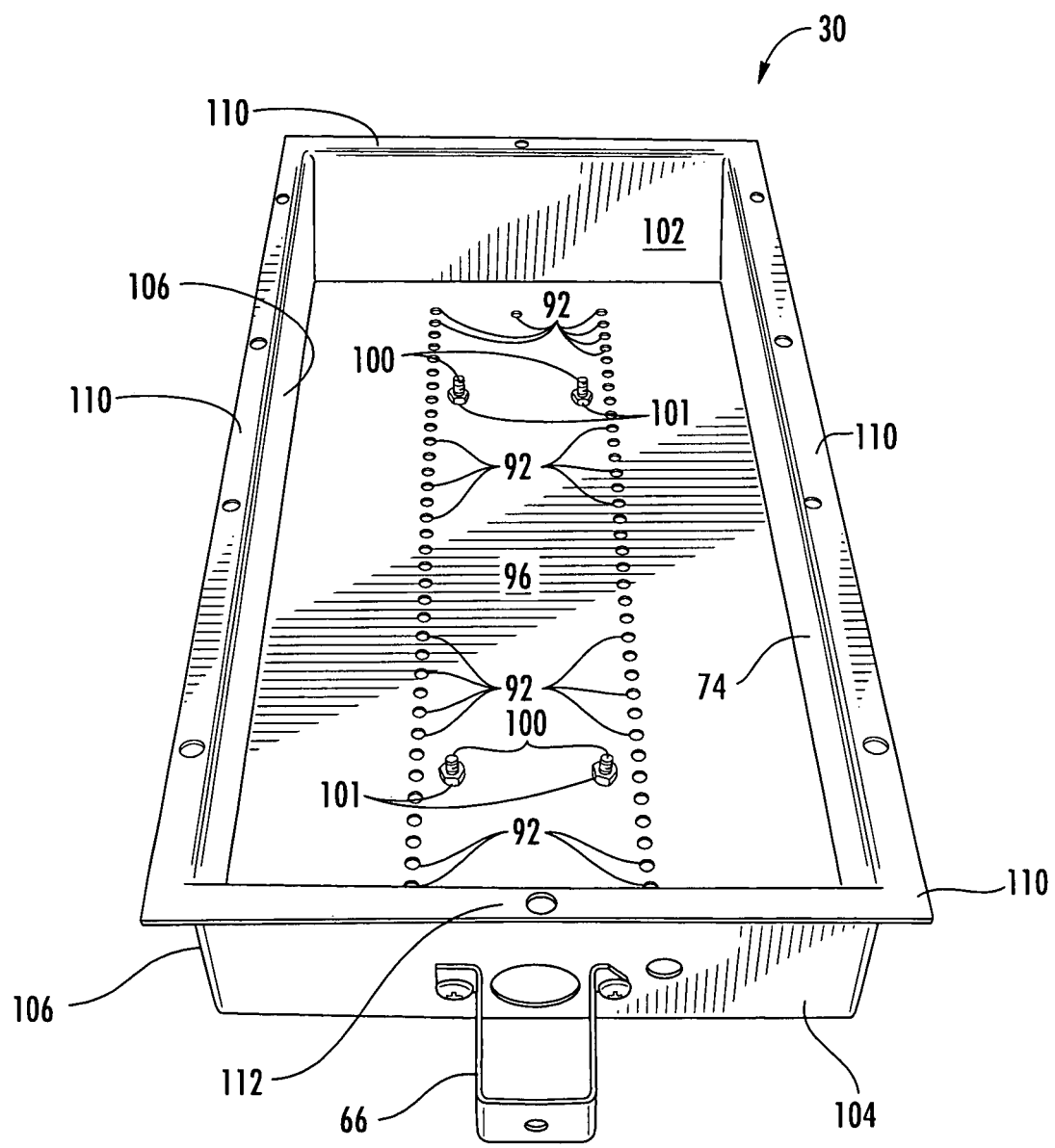
FIG. 5 is a top perspective view of a burner housing that is partially shown in FIGS. 1-4.

FIG. 5 is a top perspective view of the burner housing 30 with the valve's mounting bracket 66 mounted thereto. The burner housing 30 includes a bottom wall 96 that includes the combustion chamber's intake ports 92. The intake ports 92 are in the form of apertures extending through the bottom wall 96. In accordance with the first embodiment, the intake ports 92 include a couple of intake ports that are arranged between a front row of the intake ports and a rear row of the intake ports. The intake ports 92 may be arranged differently than shown in FIG. 5. FIG. 5 shows bolts 100 extending through holes in the bottom wall 96. The bolts optionally may extend through spacers. The spacers may be in the form of washers, nuts 101, or any other suitable spacers. Only a few of the bolts 100 and nuts 101 are identified with their reference numerals in the figures in an effort to clarify the views. The front wall 74 of the burner housing 30 extends upwardly from a front edge of the bottom wall 96. Similarly, right, left and rear walls 102, 104, 106 of the burner housing 30 extend upwardly from right, left and rear edges of the bottom wall 96.

The left wall 104 includes both a hole that the air injector 62 (e.g., see FIGS. 2-4) extends through and a hole that the igniter 50 (FIG. 6) extends through. A peripheral flange 110 extends outwardly (e.g., perpendicularly) from the upper edges of the upright walls 74, 102, 104, 106 of the burner housing 30. As shown in FIG. 5, the flange 110 include holes that extend through the flange, as will be discussed in greater detail below. Except for the intake ports 92 and the upward opening defined between the upper edges of the walls 74, 102, 104, 106, the other openings in the burner housing 30 are closed to substantially eliminate air flow therethrough when the burner assembly of the first embodiment if fully assembled.

Figure 6:
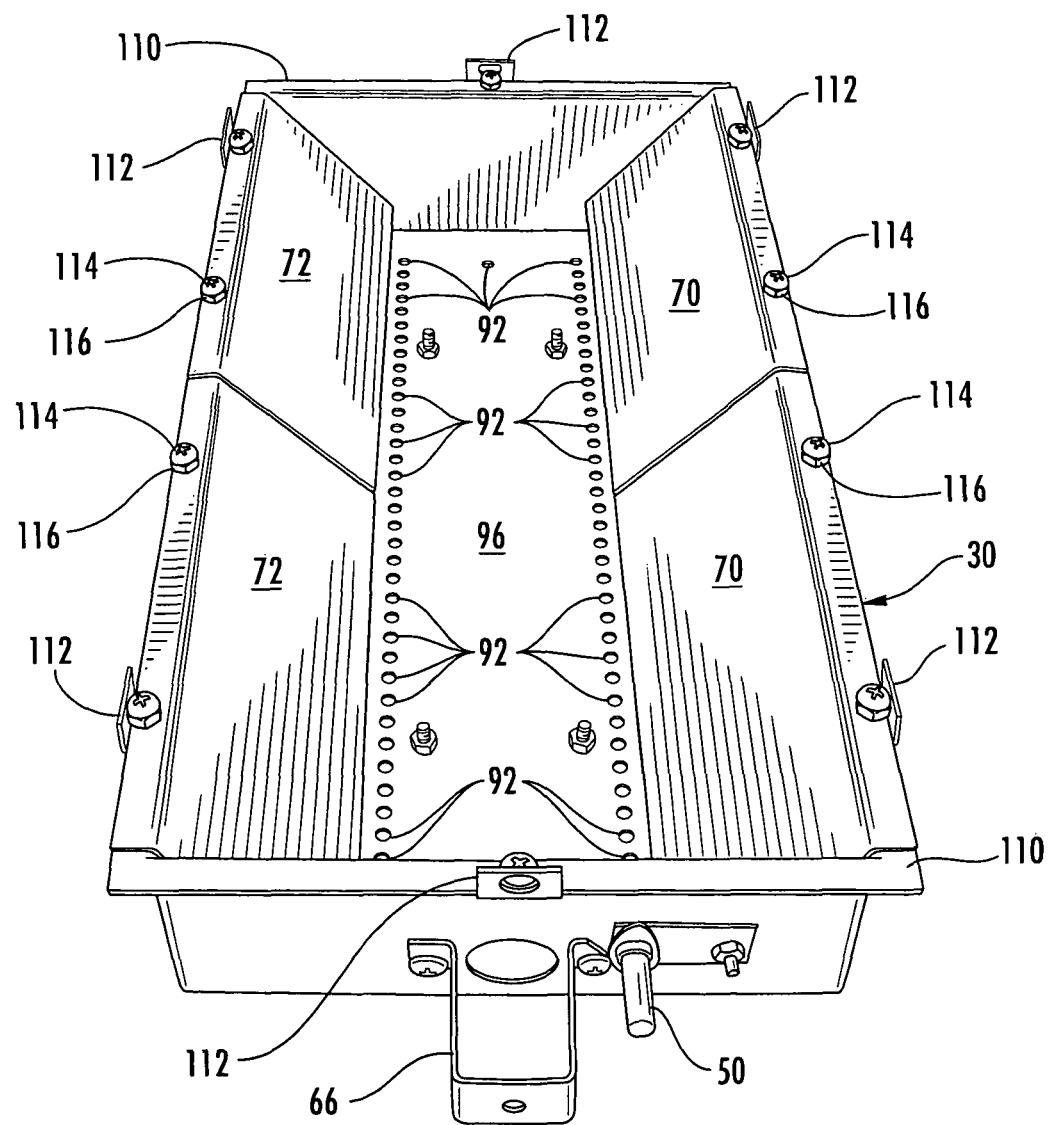
FIG. 6 is a left, top perspective view of the burner housing in combination with other features of the first embodiment.

FIG. 6 is a top perspective view of the burner housing 30 in combination with the valve's mounting bracket 66, igniter 50, and baffles 70, 72, and further in combination with mounting brackets 112 for the emitter plate 34 (FIGS. 1, 3 and 4). The baffles 70, 72 and emitter's mounting brackets 112 are attached to the flange 110 by way of bolts 114 that extend through the openings in the flange. The bolts 114 may also extend through spacers. The spacers may be in the form of washers, nuts 116, or any other suitable spacers. Only a few of the bolts 114 and nuts 116 are identified with their reference numerals in the figures in an effort to clarify the views.

As best understood with reference to FIGS. 4 and 6, each of the baffles 70, 72 includes an oblique portion, a horizontal upper flange, and an upright lower flange. The oblique portion of each baffle 70, 72 extends obliquely into the interior of the combustion chamber 80. For each of the baffles 70, 72, its upper flange is mounted to, and in opposing face-to-face contact with, the burner housing's flange 110. For each of the baffles 70, 72, its lower flange extends vertically, and the lower edge of the lower flange is in close proximity to, yet typically spaced apart from, the bottom wall 96 of the burner housing 30. As alluded to above, the burner housing 30 may be lined with insulation 75. For example and as schematically shown in FIG. 4, the insulation 75 may be included in the sub-chambers defined between the baffles 70, 72 and the respective walls (e.g., the front and rear walls 74, 106) of the burner housing 30. The insulation 75 is omitted from first and second versions of the first embodiment.

The front baffles 70 are spaced apart from one another so that a gap is defined between the front baffles 70, the rear baffles 72 are spaced apart from one another so that a gap is defined between the rear baffles 72, gaps are respectively defined between the lower edges of the baffles 70, 72 and the bottom wall 96 of the burner housing 30, and gaps are respectively defined between the front and rear walls 74, 106 of the burner housing 30 and the baffles 70, 72; and the convective products of combustion 84 can flow through these gaps into the sub-chambers defined between the baffles 70, 72 and the respective walls (e.g., the front and rear walls 74, 106) of the burner housing 30. As a result, opposite sides of the baffles 70, 72 are exposed to, and heated by, the convective products of combustion 84.

As apparent from FIG. 4 and as alluded to above, the combustion chamber 80 defines an interior space, and the baffles 70, 72 extend into the combustion chamber so that they respectively separate the combustion chamber's interior space into an inner interior space 117, a front outer interior space 118, and a rear outer interior space 119. As should be apparent from the foregoing, the inner interior space 117 and the outer interior spaces 118, 119 are typically in fluid communication with one another so that at least some of the convective products of the combustion 84 flow from the inner interior space into the outer interior spaces, as will be discussed in greater detail below.

Figure 7:
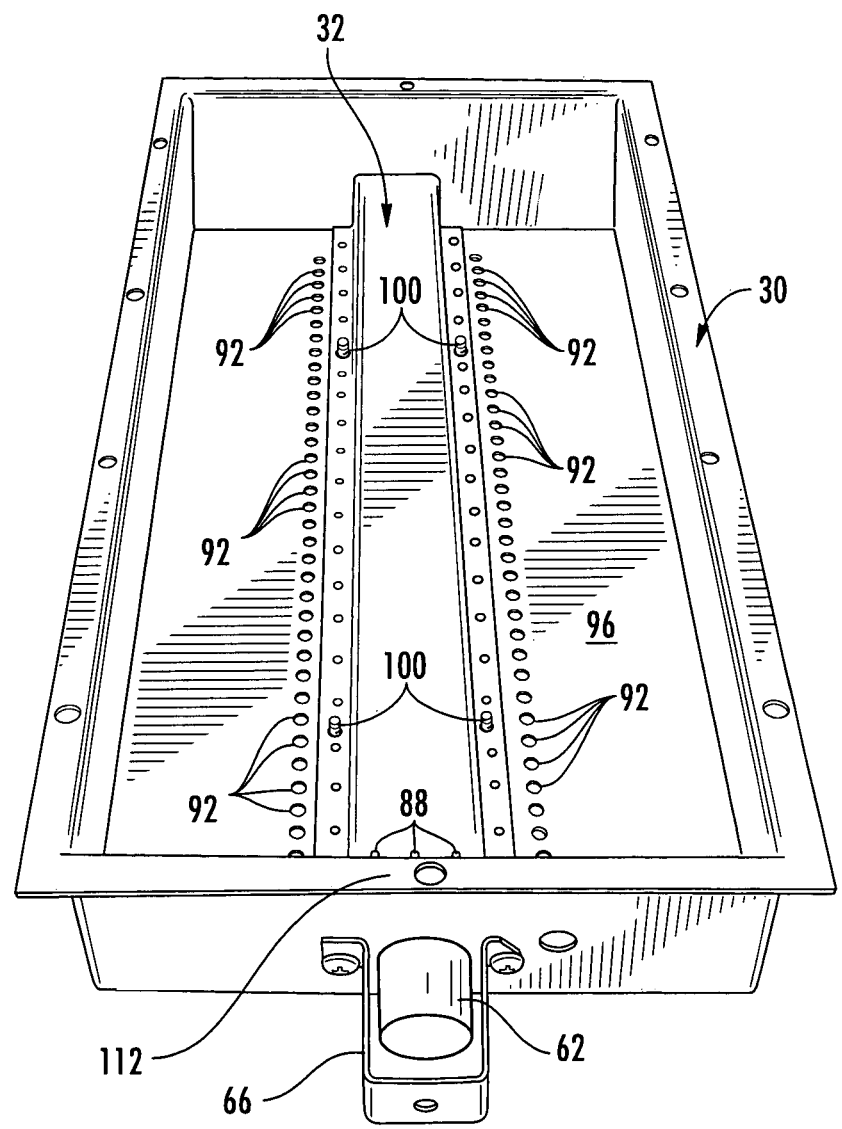
FIG. 7 is a left, top perspective view of the burner housing in combination with different features of the first embodiment, including a burner.
Figure 8:
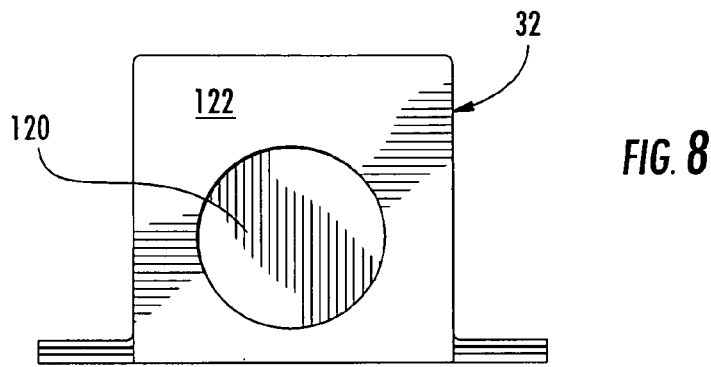
FIG. 8 is an isolated, left elevation view of the burner.
Figure 9:
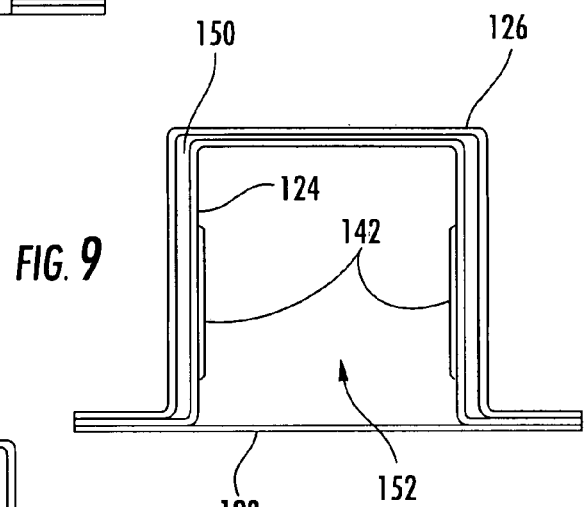
FIG. 9 is an isolated, left elevation view of the burner with its right and left end plates removed.
Figure 10:
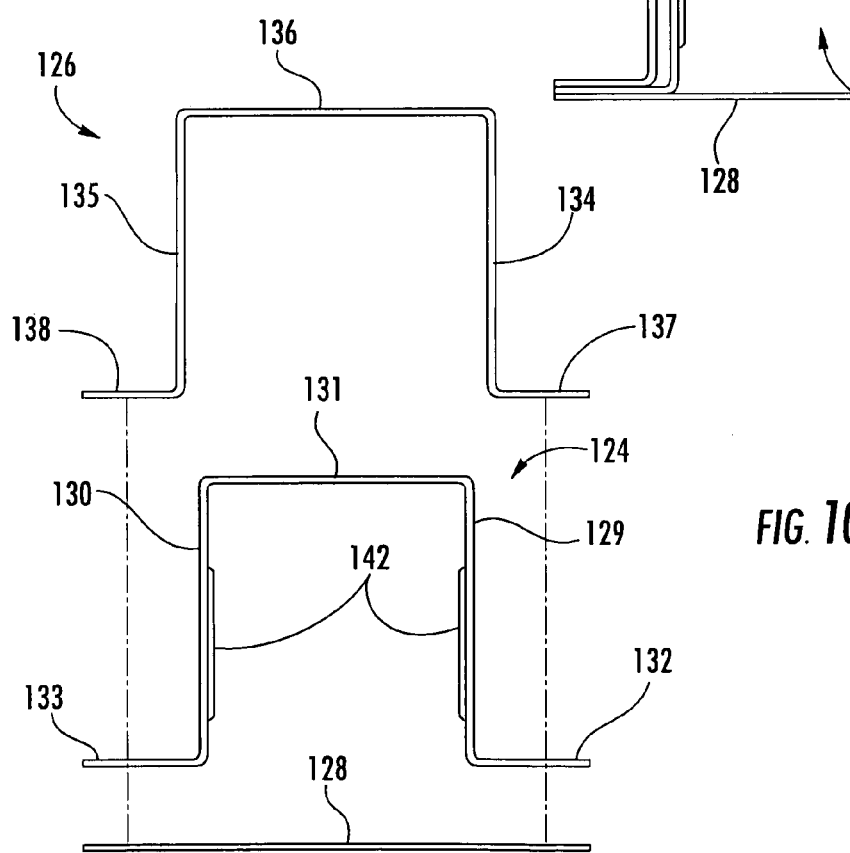
FIG. 10 is an isolated, partially exploded, left elevation view of the burner with its right and left end plates removed.
Figure 11:
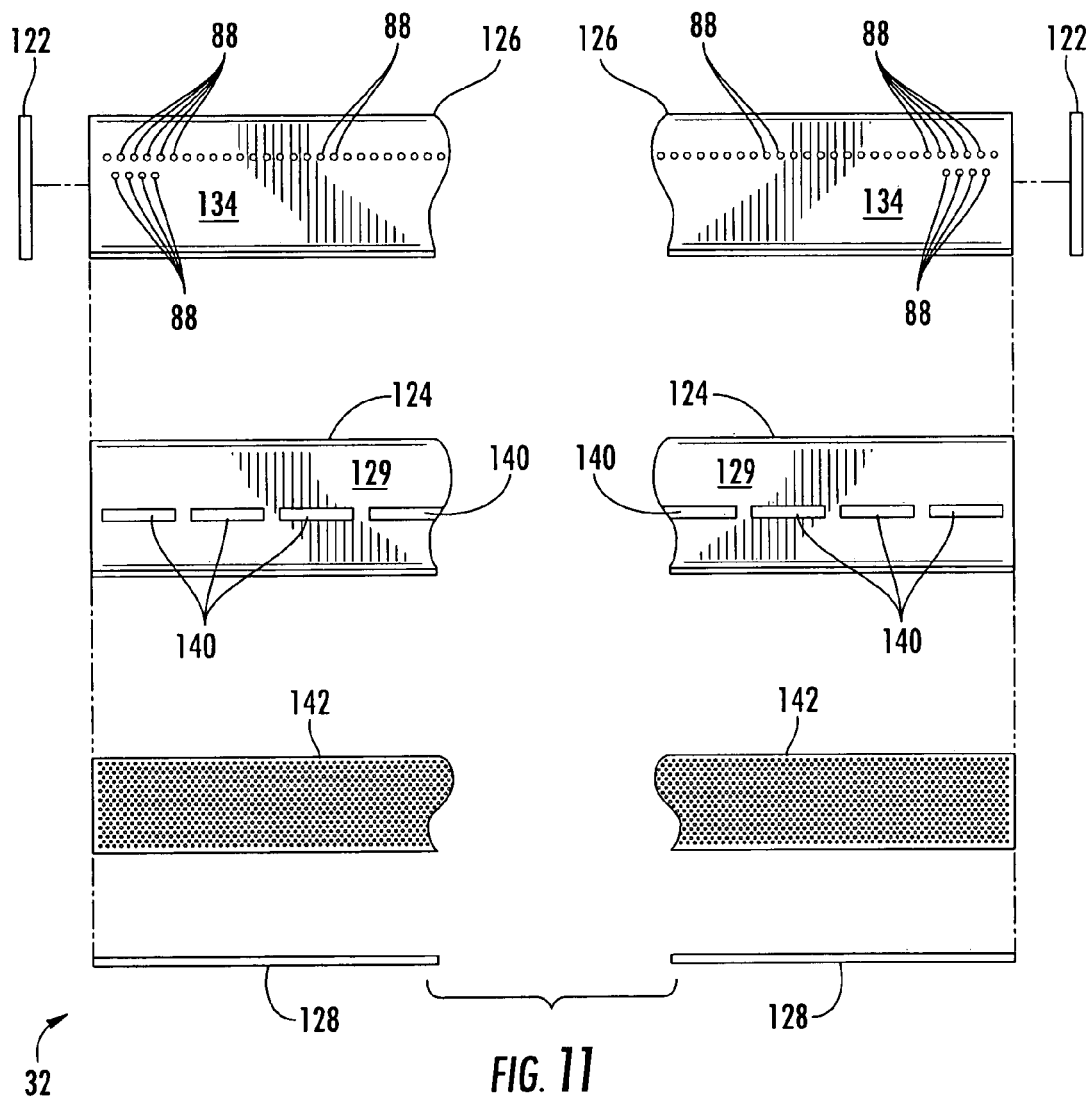
FIG. 11 is an isolated, fully exploded, front elevation view of the burner.

FIG. 7 is a top perspective view of the burner housing 30 in combination with the valve's mounting bracket 66, the burner 32 and the air injector 62. FIG. 8 is an isolated, left elevation view of the burner 32. FIG. 9 is an isolated, left elevation view of the burner 32 with its right and left end plates 120, 122 removed, and a right elevation view would be the same as FIG. 9. FIG. 10 is an isolated, partially exploded, left elevation view of the burner 32 with its right and left end plates 120, 122 removed, and a right elevation view would be the same as FIG. 10. FIG. 11 is an isolated, fully exploded, front elevation view of the burner 32, and a right elevation view would be the same as FIG. 11. The middle portion of the burner 32 is not shown in FIG. 11 for purposes of simplification, and to illustrate that the lengths and other dimensions shown may vary.

As best understood with reference to FIGS. 8-11, the burner 32 includes a somewhat n-shaped inner channel 124 mounted between (e.g., nested between) a somewhat n-shape outer channel 126 and a flat base plate 128. Each of the burner's channels 124, 126 includes front and rear walls extending downwardly (e.g., vertically, perpendicularly) respectively from front and rear edges of an upper wall (e.g., a horizontally extending upper wall), and front and rear lower flanges extending outwardly (e.g., vertically, perpendicularly) from the lower edges of the front and rear walls. More specifically and as best understood with reference to FIG. 10, the inner channel 124 includes a front wall 129, rear wall 130, upper wall 131, front flange 132 and rear flange 133. Similarly, the outer channel 126 includes a front wall 134, rear wall 135, upper wall 136, front flange 137 and rear flange 138.

As best understood with reference to FIG. 11, for each of the front and rear walls 134, 135 (also see FIG. 10) of the outer channel 126, the wall includes holes that extend through the wall and are the discharge ports 88 of the burner 32. For each of the front and rear walls 134, 135 of the outer channel 126, the discharge ports 88 are arranged in a continuous upper row, and short right and left lower rows that are below and offset with respect to the upper row. As best understood with reference to FIG. 7, the upper wall 136 of the outer channel 126 typically does not include discharge ports 88, except that it may include a lateral row of "crossover" discharge ports 88 proximate the left end, as will be discussed in greater detail below. The discharge ports 88 may be arranged differently. For example, the upper wall 136 of the outer channel 126 may include one or more (e.g., numerous) discharge ports (not shown) that are in addition to the "crossover" discharge ports 88 in the outer channel's upper wall.

As best understood with reference to FIG. 11, for each of the front and rear walls 129, 130 (also see FIG. 10) of the inner channel 124, the wall includes holes 140 that extend through the wall and are typically larger than, and at a lower elevation than, the discharge ports 88. Alternatively, the holes 140 may be at a higher elevation than, or the same elevation as, the discharge ports 88. For each of the front and rear walls 129, 130 of the inner channel 124, the holes 140 that extend through the wall are typically each covered (e.g., obstructed) on the interior side of the wall by an interior cover 142, or the like, that may be for inhibiting any flash-back. The covers 142 are mounted to the interior sides (or alternatively to the exterior sides) of the front and rear walls 129, 130, respectively. The covers 142 include/are penetrated by a multiplicity of holes that are typically smaller than the discharge ports 88. For example, each of the covers 142 may be in the form of a metal screen, perforated metal plate, or any other type of material suitable for allowing gas to flow therethrough while, for example, inhibiting flash-back. The rear interior cover 142 is hidden from view behind the front interior cover 142 in FIG. 11. The multiplicity of holes in the front interior cover 142 may not be shown to scale in FIG. 11.

The pieces of the burner 32 are respectively attached to one another such as by welding, or using any other suitable means for attaching. As best understood with reference to FIG. 9, the height and width of the inner channel 124 are smaller than the height and width of the outer channel 126 so that in the assembled burner 32 an upper gap is defined between the upper walls 131, 136, a forward gap is defined between the front walls 129, 134, and a rear gap is defined between the rear walls 130, 135. The upper gap may be narrower than each of the forward and rear gaps. The upper, rear and forward gaps are open to one another/in fluid communication with one another and together form an outer plenum 150 of the burner 32. The outer plenum 150 is defined between the inner and outer channels 124, 126. An inner plenum 152 of the burner 32 is defined between the inner channel 124 and the base plate 128. The inner and outer plenums 150, 152 are in fluid communication with one another by way of the covers 142 and the holes 140 in the front and rear walls 129, 130 of the inner channel 124.

The right and left ends of the outer plenum 150 are closed by the end plates 120, 122. The right end of the inner plenum 152 is closed by the right end plate 120, but the left end of the inner plenum is only partially obstructed by the left end plate 122 because a hole extends through the left end plate for receiving the air injector 62.

As best understood with reference to FIG. 2, the lateral row of "crossover" discharge ports 88 (FIG. 7) in the top wall of the outer channel 126 are covered by the downwardly open crossover channel 58 (FIGS. 2 and 3) that is mounted to the top wall of the outer channel. If FIG. 2 was not schematic, the lateral row of "crossover" discharge ports 88 in the top wall of the outer channel 126 would be hidden from view below the crossover channel 58. However, the lateral row of "crossover" discharge ports 88 in the top wall of the outer channel 126 is schematically shown in FIG. 2 in order to illustrate that the lateral row of "crossover" discharge ports 88 is in fluid communication with the "crossover" passageway that is defined between crossover channel 58 and the top wall of the outer channel. More specifically, the crossover channel 58 includes right and left walls extending downwardly respectively from right and left edges of an upper wall. Considering the crossover channel 58 in isolation, its bottom, front end and rear end are open. As schematically shown in FIG. 2, the lateral row of "crossover" discharge ports 88 in the top wall of the outer channel 126 are positioned between the right and left walls of the crossover channel 58, so that the "crossover" discharge ports 88 are in fluid communication with the "crossover" passageway that extends through the crossover channel 58 and is open at the front and rear ends of the crossover channel, as will be discussed in greater detail below.

As best understood with reference to FIGS. 4 and 7, the assembled burner 32 is mounted to the burner housing 30 by placing the burner over the bottom wall 96 of the burner housing so that the upper ends of the bolts 100 respectively extend through mounting holes in the burner, and the spacers (e.g., nuts 101 that are labeled in FIGS. 4 and 5) support the base plate 128 of the burner 32 above the bottom wall 96 of the burner housing 30, to restrict conductive heat transfer between the base plate and the burner. That is and in accordance with the first embodiment, a gap is defined between the base plate 128 of the burner 32 and the bottom wall 96 of the burner housing 30; however, the gap may be omitted. Thereafter and for further securing the burner 32, nuts or other suitable fasteners may be attached to the upper ends of the bolts 100.

More specifically regarding the burner's mounting holes that receive the bolts 100, each of the burner's forward mounting holes is a composite hole formed by a coaxial arrangement of a forward hole in the base plate 128, a hole in the front flange 132 of the inner channel 124, and a hole in the front flange 137 of the outer channel 126. Similarly, each of the burner's rearward mounting holes is a composite hole formed by a coaxial arrangement of a rearward hole in the base plate 128, a hole in the rear flange 133 of the inner channel 124, and a hole in the rear flange 138 of the outer channel 126. The burner 32 may be mounted by any other suitable method.

As best understood with reference to FIGS. 3-5, the lower surface of the marginal area of the emitter plate 34 rests upon supports (e.g., the upper surfaces of the heads of the bolts 114 or any other suitable supports) so that the lower surface of the emitter plate is suspended above and in opposing face-to-face relation with the burner housing 30, burner 32 and baffles 70, 72. More specifically, the lower surface of the marginal area of the emitter plate is suspended above and in opposing face-to-face relation with the flange 110 of the of the burner housing 30 and the upper flanges of the baffles 70, 72. Even more specifically, at the front of the burner housing 30, between respective supports (e.g., bolts 114 and nuts 115 shown and labeled in FIG. 6), upright gaps are defined between the lower surface of the marginal area of the emitter plate 34 and the upper flanges of the front baffles 70 (or the flange 110 of the of the burner housing 30 in the second version of the first embodiment in which the front baffles 70 are omitted), and these gaps are the exhaust ports 86 that are located at the front of the of the burner housing. Likewise, at the rear of the burner housing 30, between respective supports (e.g., bolts 114 and nuts 115), upright gaps are defined between the lower surface of the marginal area of the emitter plate 34 and the upper flanges of the rear baffles 72 (or the flange 110 of the of the burner housing 30 in the second version of the first embodiment in which the rear baffles 72 are omitted), and these gaps are the exhaust ports 86 that are located at the rear of the of the burner housing 30. Similarly, at the right and left ends of the burner housing 30, between respective supports (e.g., bolts 114 and nuts 115), upright gaps are defined between the lower surface of the marginal area of the emitter plate 34 and the flange 110 of the burner housing 30, and these gaps are the exhaust ports 86 that are located at the right and left ends, respectively, of the of the burner housing 30. In accordance with the first embodiment, the emitter plate 34 is solid, and in a top plan view of the compound heater 76, the peripheral edge of the emitter plate overlies the outer peripheral edge of the flange 110 of the burner housing 30; therefore, the emitter plate covers (e.g., at least partially obstructs) the entire upper opening of the burner housing 30 and protects the burner 32 by keeping objects (e.g., rain, moisture, grease, ash and/or small particles of food (e.g., charred remains of food being cooked), or the like) from falling into the upper opening of the burner housing.

As discussed above and in accordance with the first embodiment, the burner assembly includes the burner housing 30, burner 32, air injector 62 and control valve 64; the compound heater includes the burner assembly and the emitter plate 34; and the cooking apparatus includes the compound heater and something for supporting food being cooked (e.g., the cooking grids 36). Some aspects of the operation of the burner assembly, compound heater and cooking apparatus of the first embodiment are discussed in greater detail in the following.

In operation, when the control knob 48 is adjusted so that the control valve 64 supplies combustible gas to the air injector 62, the air injector supplies a mixture of the combustible gas and primary air (a gas-air mixture) to the burner's inner plenum 152. The gas-air mixture is then supplied from the inner plenum 152 to the burner's outer plenum 150 by way of passageways of the inner plenum, with the passageways being defined by the holes through the covers 142 and the holes 140 of the burner's inner channel 124. The covers 142 may be omitted, in which case the passageways of the inner plenum are typically solely defined by the holes 140 of the burner's inner channel 124, in which case there may be a greater number of the holes 140, with each being smaller.

The gas-air mixture is supplied from the outer plenum 150 to the interior of the combustion chamber 80 by way of the burner's discharge ports 88. In accordance with an alternative embodiment, the inner channel 124 and the covers 142 may be omitted from the burner 32, in which case the air injector 62 supplies the gas-air mixture to the sole burner plenum defined between the outer channel 126 and the base plate 128, and the gas-air mixture is then supplied from that sole plenum to the interior of the combustion chamber 80 by way of the burner's discharge ports 88. The gas-air mixture typically cools the burner 32.

The gas-air mixture exiting the discharge ports 88 in the interior of the combustion chamber 80 may be ignited in any suitable manner so that a flame 82 forms downstream from each of the discharge ports 88. In accordance with the first embodiment, the igniter 50 may be operated to provide a spark to the discharge ports 88 proximate the left end of the front of the burner 32, so that the flames 82 are first formed/lit proximate the left end of the front of the burner, and then the flames at the lit discharge ports generally sequentially ignite the flames at adjacent discharge portions (e.g., flames progress from front to rear through the "crossover" passageway that is defined by the crossover channel 58, and flames progress from left to right along the front and rear walls 134, 135 of the of the burner's outer channel 126). The flames 82 and convective products of combustion 84 are contained in the interior of the combustion chamber 80. In accordance with the first embodiment, the velocity of the gas-air mixture through the discharge ports 88 is greater than the flame speed (e.g., the flame speed for methane is 2.2 feet/second and the flame speed for propane is 2.7 feet/second), so that the flames 82 are typically substantially spaced apart from the burner 32 (e.g., the burner 32 is a port-type convection burner rather than an infrared burner).

The secondary air 90 enters the interior of the combustion chamber 80 from the intake ports 92. The convective products of combustion 84 exit from the interior of the combustion chamber 80 by way of the exhaust ports 86. In accordance with the first embodiment, the emitter plate 34 is solid and the exhaust ports 86 are positioned peripherally, so that the convective products of combustion 84 that exit the combustion chamber 80 flow away from the combustion chamber by free convection, and the direction of this flow is away from any food products being cooked (e.g., on the cooking grids 36). Therefore, the food being cooked is not dried by the convective products of combustion 84. Also, the emitter plate 34 is heated across its length and width in a way that provides for reasonably good distribution of the infrared energy at the plane at which the food is supported on the cooking grids 36 (FIG. 1) for being cooked.

In accordance with the first embodiment, the burner 32 operates within the combustion chamber 80, which is enclosed except for the exhaust ports 86 and intake ports 92. The air injector 62 extends through a wall of the combustion chamber 80 so that the primary air is brought in from outside of the combustion chamber 80. Typical temperature on high fire (e.g., while the burner 32 is operating on its highest setting/highest energy output) of the hot products of combustion within the combustion chamber 80 can be in excess of 1200° F.; therefore, at least a portion of the surfaces of the burner 32 will be exposed to temperatures in this range, and typically the burner 32 is exposed to a relatively small amount of (cooling) excess secondary air 92 in order to facilitate the high temperature within the combustion chamber 80. In accordance with the first embodiment, the burner 32 is designed in a manner that seeks to eliminate auto ignition of the gas-air mixture within the burner while the combustion chamber 80 contains combustion products at temperatures up to 1400° F.

In accordance with the first embodiment, there is a spaced relationship between the walls of the burner's channels 124, 126, so that there are gaps between them, as mentioned above. These gaps/the burner's outer plenum 150 acts as an insulator to the burner's inner channel 124 and inner plenum 152. Therefore, the gas-air mixture contained within the inner plenum 152 typically remains well below the auto ignition temperature of the mixture of fuel and air within the inner plenum.

In accordance with the first embodiment, the volume between the walls of the channels 124, 126 (i.e., the volume of the burner's outer plenum 150) is restricted to an amount that will not provide for the expansion of the gases if combustion was initiated in the gap between the channels 124, 126. This forces the combustion to proceed at the exit of the discharge ports 88 of the outer channel 126. The holes (e.g., ports or apertures) in the sheets 142 (e.g., screens or perforated plates, or the like) mounted to the inner channel 146 are smaller than the discharge ports 88 such that a small pressure drop occurs through the holes in the sheets to improve the distribution of the gas-air mixture flowing to the discharge ports 88. The combined flow area of the sheets 142 can exceed the flow area of the discharge ports 88 provided the pressure drop through the discharge ports 88 is sufficient to assure good distribution of the gas-air mixture through all of the discharge ports 88. While some pressure drop across the sheets 142 of the inner channel 124 can assist in providing better distribution of the gas-air mixture, it is not essential (e.g., so long as the distribution through the discharge ports 88 is controlled by the pressure drop through the discharge ports 88).

Reiterating from above, in accordance with the first version of the first embodiment, the insulation 75 (FIG. 4) is omitted from the combustion chamber 80. In accordance with the second version of the first embodiment, the insulation 75 and the baffles 70, 72 are omitted from the combustion chamber 80.

Following are approximate values for a typical combustion analysis for the compound heater 76 with the burner 32 operating at 22,000 BTU/HR (the amounts of various chemical components were determined from an analysis of the gasses exhausted from the exhaust ports 86), in accordance with the first version of the first embodiment:

the amount of carbon monoxide is 10 PPM;
the amount of oxygen ($O_2$) present is 5.6% by volume;
the amount of carbon dioxide present is 8.6% by volume;
the amount of excess air present is 32.6% (i.e., there is 32.6% more air present than the calculated amount of air needed for stoichiometric combustion);
the ambient air temperature is 78.7° F.;
the amount of air-free carbon monoxide is 14 PPM;
the enthalpy, as percent of energy input, of the convective products of combustion 84 exhausted from the combustion chamber 80 by way of the exhaust ports 86 is 28.4%;
the temperature of the convective products of combustion 84 exhausted from the combustion chamber 80 by way of the exhaust ports 86 is 1,256° F.; and
the temperature of the emitter plate 34 is 961° F.

More generally regarding the above-described operating conditions, the excess air present in the gasses exhausted from the exhaust ports 86 may be less than 300%, less than 250%, less than 200%, less than 150%, less than 100%, less than 50%, less than 45%, less than 40%, or less than 35%. Theoretically, these operating characteristic may be provided at a wide range of burner operation, such as, but not limited to, while the burner 32 has been and continues to operate at at least about a predetermined percentage of high fire, where the predetermined percentage may be 25%, 50%, 70%, 80%, 90% and/or 100%. Throughout this Detailed Description section of this disclosure, excess air is the percentage of air that is in excess of the calculated amount of air needed for stoichiometric combustion.

Generally described and in accordance with the first and second versions of the first embodiment, the burner 32 and the combustion chamber 80 are configured so that the combustion within the combustion chamber is not quenched, the exhaust ports 86 are appropriately sized, a controlled and limited amount of secondary air 90 is provided to the combustion chamber, and a majority of the secondary air mixes by free convection with the unburned products of combustion within the combustion chamber and provides required air for complete combustion within the combustion chamber, so that there is only a small amount of excess air that is not used in the combustion within the combustion chamber. That is, the burner 32 and the combustion chamber 80 are configured so that the combustion within the interior of the combustion chamber is close to (e.g., substantially close to) stoichiometric combustion. By definition, stoichiometric combustion results when there is a mixture capable of perfect combustion with no unused fuel or air. Stated differently, stoichiometric combustion occurs when the chemically correct ratio and mixing of fuel to air is provided.

Examples of features (e.g., aspects) that play a role in having close to stoichiometric combustion in the combustion chamber 80 are discussed in greater detail below. As discussed in greater detail below, there are several features that play a role in causing the combustion within the interior of the combustion chamber 80 to be close to stoichiometric combustion. While several of these features are discussed very specifically in the following, it is within the scope of this disclosure to use the features to varying extents, and to use the features in various combinations and subcombinations (e.g., in some situations, one or more of the features may be omitted or modified depending upon the desired balance of properties (e.g., costs)).

In accordance with one aspect of the first embodiment, the combustion chamber 80 encloses the burner 32 to improve mixing of the secondary air 90 with the fuel (e.g., combustible gas/gas-air mixture) and unburned products of combustion, minimizing the need for excess air in the combustion chamber. The combustion chamber 80 is in a spaced relationship to the burner 32 in order to insure improved mixing of the unburned products of combustion with the secondary air 90. This spaced relationship helps to facilitate the mixing of unburned gases and the available air to complete the combustion process within the combustion chamber 80. In this regard, mixing of the fuel and air is better achieved in a confined space so long as quenching of the combustion process does not occur. Mixing within a confined volume increases the intermingling of the oxygen and fuel molecules. Increased mixing allows for stoichiometric combustion to be approached.

In accordance with the first embodiment, the hot gases in the combustion chamber 80 are forced to change the direction in which they flow, so that mixing of the components of incomplete combustion and the secondary air 90 occurs. In accordance with the first embodiment, the burner's discharge ports 88 discharge the gas-air mixture in a horizontal direction. Then, the products of combustion will rise vertically during the initial phase of the combustion process. Then, they will turn to a more horizontal direction to escape through the chamber's horizontal exhaust ports 86. This concept provides a secondary benefit because the dwell time to complete the combustion process is increased. The unburned gases are exposed to an environment in which the combustion process can continue. The gas temperature within the combustion chamber 80 during high fire operation will be typically or usually be greater than the ignition temperature of the fuel (typically $CH_4$ or $C_3 H_8$). The high fire gas temperatures within the confines of the combustion chamber 80 will usually be in excess of 1200° F. while maintaining complete combustion. The total energy (enthalpy) of the exhaust gases emerging from the chamber's horizontal exhaust ports 86 during operation at the high fire will typically be about (e.g., at least about) 30-40% of the energy input.

Regarding the second version of the first embodiment (baffles 70, 72 and insulation 75 omitted), as may be understood with reference to FIGS. 2-4 and 7, the walls 74, 96, 102, 104, 106 of the burner housing 30/combustion chamber 80 surrounding the burner 32 are close enough to the burner's discharge ports 88 to allow (e.g., force) the gas emerging from the combustion process to mix with the secondary air 90, but provides sufficient distance to prevent flame impingement on the walls 74, 102, 104, 106 to avoid the possibility of quenching the flame 82. If the flame 82 is quenched by the walls 74, 96, 102, 104, 106, incomplete combustion could occur and carbon could form on the walls 74, 96, 102, 104, 106.

In accordance with the first embodiment, better mixing of the air and unburned products of combustion by free convection results as the volume of the combustion chamber 80 decreases. In accordance with the first embodiment, good results may be achieved using energy input as high as 40 BTU/HR per cubic inch of the interior volume of the combustion chamber 80. That is, the compound heater 76 may be configured to provide 40 BTU/HR per cubic inch of the interior volume of the combustion chamber 80. In accordance with the first embodiment, the energy input may be as low as 14 BTU/HR per cubic inch of the interior volume of the combustion chamber 80. In accordance with another embodiment of this disclosure (e.g., an embodiment that is at least similar to the embodiment shown in FIGS. 23-25), good results were achieved with the compound heater providing 50.9 BTU/HR per cubic inch of the interior volume of the combustion chamber.

In accordance with one aspect of this disclosure: the compound heater 76 (e.g., the burner 32) may operate at at least about 14 BTU/HR per cubic inch of the volume of the interior space of the chamber 80; a compound heater (e.g., a burner in the compound heater's chamber) may operate in a range from at least about 14 BTU/HR per cubic inch of the volume of the interior space of the chamber to at least about 40 BTU/HR per cubic inch of the volume of the interior space of the chamber; a compound heater (e.g., a burner in the compound heater's chamber) may operate in a range from at least about 14 BTU/HR per cubic inch of the volume of the interior space of the chamber to at least about 50 BTU/HR per cubic inch of the volume of the interior space of the chamber; a compound heater (e.g., a burner in the compound heater's chamber) may operate in a range from at least about 14 BTU/HR per cubic inch of the volume of the interior space of the chamber to at least about 50.9 BTU/HR per cubic inch of the volume of the interior space of the chamber; and/or a compound heater (e.g., a burner in the compound heater's chamber) may operate at about 14 BTU/HR per cubic inch of the volume of the interior space of the chamber, at about 40 BTU/HR per cubic inch of the volume of the interior space of the chamber, at about 50 BTU/HR per cubic inch of the volume of the interior space of the chamber, and/or at about 50.9 BTU/HR per cubic inch of the volume of the interior space of the chamber.

The distance between the burner's discharge ports 88 and the side walls 74, 102, 104, 106 may be in the range from about 1.5 inches to about 6 inches, and the distance from the center of the burner's discharge ports 88 to the bottom side of the emitter plate 34 may be in the range from about 1 inch to about 3.5 inches. As the combustion chamber 80 is decreased in size, the mixing improves but incomplete combustion can occur if the flame 82 impinges on the burner housing's walls 74, 96, 102, 104, 106 or the underside of the emitter plate 34. When the temperature of a surface is less than the ignition temperature of the fuel, incomplete combustion and carbon formation can result.

Energy is dissipated from the emitter plate 34 in the form of infrared radiation along with any losses from the walls 74, 96, 102, 104, 106 of the burner housing 30/combustion chamber 80. In accordance with the first embodiment, the walls 74, 96, 102, 104, 106 will be at a lower temperature than the temperature of the emitter plate 34. The exterior of the walls 74, 96, 102, 104, 106 are exposed to a lower temperature (e.g., ambient temperature of the surrounding air). Therefore, for the second version of the first embodiment (baffles 70, 72 and insulation 75 omitted), the positive exchange of radiant energy to the interior of the combustion chamber 80 based on the Stefan Boltzman Law would be from the emitter plate 34 to the interior surfaces of the walls 74, 96, 102, 104, 106. For this reason, the interior surfaces of the walls 74, 96, 102, 104, 106 will typically be a material with a low emissivity in order that the energy would be reflected back to the emitter plate 34. Typically the walls 74, 96, 102, 104, 106 of the combustion chamber 80 are manufactured from a material with a low emissivity or coated with a low emissivity material (e.g., a reflective material), so that the infrared radiation loss from the walls 74, 96, 102, 104, 106 of the combustion chamber 80 is reduced.

In accordance with the first embodiment and one acceptable method of operation, the material from which the burner housing 30/combustion chamber 80 is fabricated should be capable of operating at up to 800° F. or higher. Such material could be nickel plated steel, chrome plated steel, stainless steel, aluminized steel or another material that will withstand the temperature limits. This temperature limit could be reduced by insulating the interior the walls 74, 96, 102, 104, 106 to improve efficiency. In accordance with the first embodiment, the emissivity of the material from which the burner housing 30 is constructed is typically less than 0.3. For example, the burner housing 30 may be constructed of carbon steel coated with a high temperature, reflective paint (1000° F.). Examples of other suitable materials are aluminized steel and 304 stainless steel.

In accordance with one acceptable method of operating the compound heater 76 of the first embodiment, in order to maintain complete combustion in the combustion chamber 80, the pressure within the combustion chamber 80 (e.g., immediately under the emitter plate 34 and, therefore, outside of the burner 32) does not exceed, or only slightly exceeds, the pressure (e.g., ambient atmospheric pressure) in which the combustion chamber 80 is located. While the compound heater 76 is operating (e.g., at 22,000 BTU/HR and with the other characteristics of the "typical combustion analysis" presented above), it is preferred for the difference between the pressure within the combustion chamber 80 (e.g., immediately under the emitter plate 34 and, therefore, outside of the burner 32) and the pressure outside the combustion chamber (e.g., ambient atmospheric pressure) to be zero inches water column (static gauge pressure), or for the static pressure within the combustion chamber 80 (e.g., immediately under the emitter plate 34 and, therefore, outside of the burner 32) to be only slightly higher or slightly lower than (e.g., substantially the same as) the pressure outside the combustion chamber (e.g., ambient atmospheric pressure).

In accordance with the first embodiment, it is believed to be important, when it is desired to optimally operate the compound heater 76, to maintain a near neutral gauge pressure or slightly negative gauge pressure within the combustion chamber 80 (e.g., immediately under the emitter plate 34 and, therefore, outside of the burner 32). While it may be ideal to maintain a static gauge pressure of zero inches water column within the combustion chamber 80 (yet outside of the burner 32) as compared to the pressure outside the combustion chamber 80 (e.g., ambient atmospheric pressure), in order to optimally operate the compound heater 76 of the first embodiment, it is believed that the pressure within the combustion chamber 80 (e.g., immediately under the emitter plate 34 and, therefore, outside of the burner 32), as compared to the pressure outside the combustion chamber 80 (e.g., ambient atmospheric pressure), should never exceed a static gauge pressure of 0.009 inches water column under any operating conditions; otherwise, erratic and incomplete combustion may occur. In accordance with one aspect of this disclosure, the static gauge pressure measured at a location that is within the interior space of the combustion chamber 80 and adjacent to the inner side of the emitter plate 34 may be in a range from about negative 0.015 inches water column to about 0.009 inches water column while the burner 32 is operating.

In accordance with one aspect of this disclosure, the pressure within the combustion chamber 80 (e.g., immediately under the emitter plate 34 and, therefore, outside of the burner 32), as compared to (i.e., relative to) the pressure outside the combustion chamber 80 (e.g., ambient atmospheric pressure), is about 0.009 inches water column (static gauge pressure) or less (e.g., while the compound heater 76 is operating (e.g., at 22,000 BTU/HR and with the other characteristics of the "typical combustion analysis" presented above)). In accordance with other aspects of this disclosure, while the compound heater 76 is operating (e.g., at 22,000 BTU/HR and with the other characteristics of the "typical combustion analysis" presented above) the static gauge pressure within the combustion chamber 80 (e.g., immediately under the emitter plate 34 and, therefore, outside of the burner 32), as compared to the pressure outside the combustion chamber 80 (e.g., ambient atmospheric pressure), is less than about 0.009 inches water column, or less than about 0.008 inches water column, or less than about 0.007 inches water column, or less than about 0.006 inches water column, or less than about 0.005 inches water column, or less than about 0.004 inches water column, or less than about 0.003 inches water column, or less than about 0.002 inches water column, or less than about 0.001 inches water column, or less than about 0.0009 inches water column, or less than about 0.0005 inches water column, or less than about 0.0001 inches water column. The above-discussed static gauge pressures within the combustion chamber 80 may exist substantially throughout the interior space of the combustion chamber 80 (e.g., the above-discussed static gauge pressures typically will not be present in the burner 32 and may not exist at positions within the interior space of the combustion chamber 80 that are within about 0.5 inches from an exhaust port 86) while the compound heater 76 is operating. Theoretically, the above-discussed static gauge pressures may be provided at a wide range of burner operation, such as, but not limited to, while the burner 32 has been and continues to operate at at least about a predetermined percentage of high fire, where the predetermined percentage may be 25%, 50%, 70%, 80%, 90% and/or 100%. Alternatively, there may be situations where it might be desirable to operate the combustion chamber 80 under different operating conditions/with different relative pressures than those mentioned above.

In accordance with one aspect of this disclosure: the interior space of the combustion chamber 80 is for at least partially containing the convective products of the combustion 84; a first side (e.g., the inner side) of the infrared emitter plate 34 partially defines (e.g., at least partially defines) the interior space of the combustion chamber and is in opposing face-to-face relation with the interior space of the combustion chamber so that the first (e.g., inner) side of the infrared emitter is for being exposed to, and heated by, the convective products of the combustion in the interior space of the chamber; a second side (e.g., the outer side) of the infrared emitter plate is for emitting infrared radiation; and the compound heater 76 is configured so that static gauge pressure, measured at a location that is within the interior space of the chamber and adjacent to the first (e.g., inner) side of the infrared emitter, does not exceed about 0.009 inches water column while the burner is operating (e.g./theoretically, while the burner 32 has been and continues to operate at at least about a predetermined percentage of high fire, where the predetermined percentage may be 25%, 50%, 70%, 80%, 90% and/or 100%). In accordance with one aspect of this disclosure, the static gauge pressure in the interior space of the combustion chamber 80 may be controlled, for example, by controlling the supplying of the secondary air 92 to the interior space of the combustion chamber 80 and/or by controlling the exhausting of the convective products of the combustion 84 from the interior space of the combustion chamber 80 (e.g., by way of the exhaust ports 86).

While the compound heater 76 is operating with the gas-air mixture being supplied to the plenum 152 within the burner, 32 the static gauge pressure within the burner's plenum 152 will typically be positive. When the burner 32 is cold (gas and air flowing without combustion) the static gauge pressure within the burner's plenum 152 will typically be in the range of 0.015 to 0.02 inches water column, relative to the pressure outside the combustion chamber 80 (e.g., ambient atmospheric pressure). After ignition, the static gauge pressure within the burner's plenum 152 typically may increase (due to the heating and expansion of the gas) and may range between 0.015 and 0.04 inches water column, relative to the pressure outside the combustion chamber 80 (e.g., ambient atmospheric pressure).

In accordance with the first embodiment, the exhaust ports 86 are sized and arranged in a manner that seeks to allow the pressure within the combustion chamber 80 (e.g., immediately under the emitter plate 34 and, therefore, outside of the burner 32) to be approximately equal to (e.g., substantially the same as) the pressure (e.g., ambient atmospheric pressure) in which the combustion chamber 80 is located, as discussed above. Therefore, there is a good distribution of the convective products of combustion 84 against (in heat transfer relationship with) the lower surface of the emitter plate 34. Therefore, the distribution of the infrared energy at the plane of the grids 36 on which the food is placed is substantially uniform, as discussed in greater detail below with reference to FIGS. 12 and 13.

In contrast, when excess flow area is provided by way of the open area provided by the exhaust ports 86 being excessive, more hot gases will escape the combustion chamber 80 or be discharged with less scrubbing action on the underside of the emitter plate 34, decreasing the conversion of the convective energy to infrared energy while increasing excess air which lowers the temperature. If the open area provided by the exhaust ports 86 is reduced to an extreme, the pressure within the combustion chamber 80 could increase and the free flow of the exhaust products would be reduced, resulting in incomplete combustion and the possibility of the formation of free carbon.

Good operating results may be achieved with the compound heater 76 having exhaust ports 86 that provide one square inch of exhaust area per 1,560 BTU/HR. Efficiency decreases due to an increase in excess air when the exhaust ports 86 of the compound heater 76 provide one square inch of exhaust area per 1000 BTU/HR. Incomplete combustion may be observed to different degrees when the exhaust ports 86 of the compound heater 76 provide one square inch of exhaust area per 2,891 BTU/HR. That is, the compound heater 76 may operate with the exhaust ports 86 providing a range of about one square inch of exhaust area per 1000 BTU/HR to about one square inch of exhaust area per 2,891 BTU/HR. More specifically the compound heater 76 may operate with the exhaust ports 86 providing a range of about one square inch of exhaust area per 1,280 BTU/HR to about one square inch of exhaust area per 2,226 BTU/HR. More specifically the compound heater 76 may operate with the exhaust ports 86 providing about one square inch of exhaust area per 1,560 BTU/HR.

In accordance with one aspect of this disclosure, the compound heater 76 (e.g., the burner 32) may: operate at at least about 1000 BTU/HR per square inch of the exhaust area of the chamber 80, operate in a range from at least about 1000 BTU/HR per square inch of the exhaust area of the chamber to at least about 2,891 BTU/HR per square inch of the exhaust area of the chamber, operate in a range from at least about 1,280 BTU/HR per square inch of the exhaust area of the chamber to at least about 2,226 BTU/HR per square inch of the exhaust area of the chamber, operate at about 1000 BTU/HR per square inch of the exhaust area of the chamber, operate at about 1,280 BTU/HR per square inch of the exhaust area of the chamber, operate at about 1,560 BTU/HR per square inch of the exhaust area of the chamber, operate at about 2,226 BTU/HR per square inch of the exhaust area of the chamber and/or operate at about 2,891 BTU/HR per square inch of the exhaust area of the chamber.

At one extreme, the excess air can be reduced by limiting the area of the exhaust ports 86 to an amount at which incomplete combustion exceeds standard limits (800PPM CO-air free). However, if the goal is to operate the compound heater 76 most efficiently, then the area of the exhaust ports 86 should not be reduced to a point at which there is incomplete combustion or the pressure within the combustion chamber 80 substantially exceeds the pressure outside the combustion chamber 80 (e.g., ambient atmospheric pressure). As indicated above in accordance with the first embodiment, the compound heater 76 may operate with substantially complete combustion while using less than 40% excess air.

In accordance with the first embodiment, the burner housing's walls 74, 96, 102, 104, 106 are exposed to the temperature of the air surrounding the combustion chamber 80 (e.g., ambient temperature) therefore; the temperature of the walls 74, 96, 102, 104, 106 varies at a temperature below the ignition temperature of the fuel. As mentioned previously, it is desirable for the space surrounding the burner 32 to be sufficient to prevent impingement of any flame 82 or unburned products of combustion against the walls 74, 96, 102, 104, 106. One solution to decreasing the volume and to avoid the impingement problem is to insulate the interior sides of the walls 74, 96, 102, 104, 106 with a material that would provide an inside surface temperature that would be greater than the ignition temperature of the fuel or unburned products of combustion.

In a variation to the second version of the first embodiment, the interior sides of the walls 74, 96, 102, 104, 106 are insulated with a ceramic fiber material (e.g., Fiberfrax brand ceramic fiber insulation) capable of operating above 2500° F., so that the surface areas within the combustion chamber 80 are above the ignition temperature of the fuel and unburned products. When the surface areas within the combustion chamber 80 are above the ignition temperature of the fuel and unburned products, the flames 82 are not quenched if they impinge the surface areas within the combustion chamber 80; therefore, incomplete combustion does not occur due to impingement. While this is an alternative method to reduce the volume of the combustion chamber 80 and would work well in many applications, using this ceramic fiber material may increase cost and may not be as durable as a high temperature metal surface.

Notwithstanding the foregoing, in a burner assembly like that of the first embodiment that does not provide for 100% complete convective mixing of fuel and air before combustion, it is impractical to eliminate all of the excess air that is provided. Excess air is required to compensate for the incomplete mixing of the unburned products of combustion and the oxygen in the air. In this regard, the rate of transfer of energy to the emitter plate 34 from the hot gases in the combustion chamber 80 is proportional to the temperature difference between the emitter plate 34 from the hot gases in the combustion chamber 80. The excess air in the combustion chamber 80 decreases the temperature difference between the emitter plate 34 and the hot gases in the combustion chamber 80. Therefore and in accordance with an acceptable method of operating the compound heater 76 of the first embodiment, the use of excess air is restricted in a manner so that, while the compound heater 76 is operating, the temperature of the gas that is within the combustion chamber 80 and adjacent to the emitter plate 34 is not reduced to less than 100° F. above the desired temperature of the emitter plate 34.

In accordance with one aspect of this disclosure, the secondary air 90 may be provided to the combustion (e.g., the supply of secondary air 90 may be restricted) so that the convective products of combustion 84 that contact and heat the inner side of the emitter plate 34, and typically also the convective products of combustion 84 that exit the combustion chamber 80 by way of exhaust ports 86, are at least about 100° F. hotter than the stabilized operating temperature of the emitter plate 34. In theory, when the emitter plate 34 reaches its stabilized operating temperature, the temperature of the emitter plate is neither decreasing nor increasing. For example, the burner 32 may be operated at a constant setting (e.g., full fire or a predetermined percentage of full fire) for a sufficient period of time for the temperature of the emitter plate 34 to stabilize. Typically, the temperature of the emitter plate 34 may vary to a limited extent while the emitter plate is at its stabilized operating temperature, such that the stabilized operating temperature may more accurately be characterized as a substantially stabilized operating temperature. For example, even when the burner 32 is on a constant setting (e.g., as defined by the control valve 64 not being adjusted), the heat output provided by the burner may vary to a limited extent due, for example, to variations in the ambient environment. Likewise, even if the heat output provided by the burner 32 does not fluctuate, the temperature of the emitter plate 34 may vary to a limited extent due, for example, to variations in the ambient environment. For example, the substantially stabilized operating temperature of the emitter plate 34 may be at least about 400° F., at least about 600° F., at least about 700° F., at least about 800° F., at least about 900° F., at least about 950° F., or about any one of these temperatures, or any other suitable temperature.

In accordance with this disclosure, when it is desired to conserve energy, the excess air in the combustion chamber 80 is kept to a minimum and the volume of the combustion chamber is limited to a volume that will enhance the mixing of the fuel and air. However, these two provisions are not essential because, for example, in some situation a balance of properties may be desired in which conserving energy is not paramount. For example, one aspect of the first embodiment is to convert primarily convective energy into infrared energy at a specified range of wavelengths. In accordance with one variation to the first embodiment in which there is 300% (or more) excess air in the exhaust exiting the combustion chamber 80, there is enough available energy in the fuel (e.g., $CH_4$ or $C_3H_8$) included in the gas-air mixture within the combustion chamber so that enough energy is transferred to the emitter plate 34 for it to emit sufficient infrared energy to meet the requirements for cooking food or many other uses.

As should be apparent from the foregoing and for example, reducing the volume of the interior of the combustion chamber 80 is not the only method of improving operation of the compound heater 76. For example, in the first version of the first embodiment, the plate-like baffles 70, 72 (FIGS. 1-4 and 6) play an advantageous role in the operation of the compound heater 76. The baffles 70, 72 extend from the side walls of the combustion chamber 80 to close proximity of the burner 32. A space between the baffles 70, 72 and the burner 32 provides a passage for the introduction of the secondary air

90. In operation, the surface temperature of the baffles 70, 72 can be above the ignition temperature of the fuel and unburned products. Since all surfaces of the baffles 70, 72 (e.g., except for their upper flanges) are exposed to the temperature of the hot gases contained within the combustion chamber 80, the baffles are heated to a higher temperature than the emitter plate 34 and the baffles are well above the temperature that would cause quenching of the flames 82 or unburned products of combustion. The baffles 70, 72 radiate infrared energy to the underside of the emitter plate 34. Also, the baffles 70, 72 reduce the mixing volume of fuel, unburned products and air without quenching the flames 82 or unburned products. The baffles 70, 72 may be made of 304 stainless steel or any other suitable material, such as, but not limited to, other types of stainless steel, ceramic coated steel plates, ceramic or high temperature glass.

The baffles 70, 72 within the combustion chamber 80 may also improve the flow of the hot gases on the interior surface (underside surface) of the emitter plate 34. The baffles 70, 72 can be positioned at an oblique angle to the burner 32 and the side walls of the combustion chamber 80 in order to diminish the flow area of the hot gases in their path to the exhaust ports 86, increasing the velocity of the hot gases. The increase of the velocity of the gases can increase the rate of heat transfer to the emitter plate 34 by improving the heat transfer coefficient. The temperature of the emitter surface increases due to the improved flow (higher velocity) of the hot gases on the underside surface of the emitter plate 34 and because of the positive exchange of infrared energy from the baffles 70, 72 to the underside of the emitter.

Whereas the baffles 70, 72 of the first embodiment extend obliquely, one or more of the baffles may be omitted and/or the baffle(s) may be configured differently (e.g., at different angles). As one alternative example, the oblique baffles 70, 72 may be replaced with an alternative baffle that is positioned in the interior space of the combustion chamber 80. The alternative baffle may be positioned between the burner 32 and the emitter plate 34, and the alternative baffle may extend parallel to the emitter plate. Typically the alternative baffle will be far enough away from the burner 32 so that it does not restrict the secondary air 90 from reaching the combustion, and typically the alternative baffle will not block the exhaust ports 86. The baffle(s) (e.g., baffles 70, 72) that are positioned in the interior space of the combustion chamber 80 may have a variety of different shapes and may be in different positions, and each of the baffle(s) may have opposite sides that are for being exposed to, and heated by, the convective products of combustion 84 in the interior space of the chamber, and the baffle(s) may be in opposing face-to-face relation with the emitter plate 34.

Figure 12:
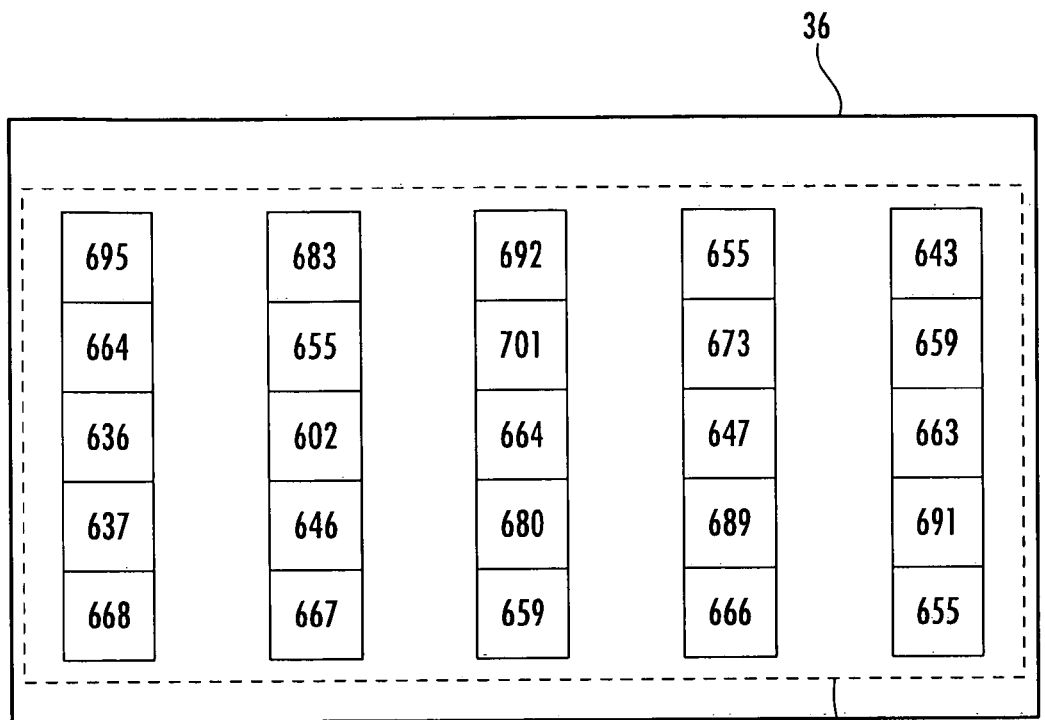
FIG. 12 is a schematic, top plan view of heated blocks upon a portion of the compound heater of a first version of the first embodiment, in accordance with a first operational example.

In accordance with a first operational example of operating the compound heater 76 of the first embodiment with the baffles 70, 72 and without the insulation 75, the burner 32 was operated at 22,000 BTU/HR for 30 minutes using a number 45 orifice in the control valve 64 and natural gas supplied at a gauge pressure of 6 inches of water column. The first operational example is described in the following. The distribution of the infrared energy and the level of the infrared energy were determined at the plane of the grids 36 on which the food is placed. Twenty five aluminum blocks (each two inches by two inches, and half an inch thick) coated with a high emissivity material were uniformly spaced over the cooking grid surface, as schematically shown in FIG. 12. FIG. 12 is a schematic top plan view of the blocks upon the schematically illustrated cooking grates 36, and the periphery of the emitter plate 34 is schematically illustrated by a dashed lines. The front edges of the cooking grates 36 are about 1.0 inch forward of the front edge of the emitter plate 34, and the front edge of the emitter plate is about 0.5 inch forward of the group of aluminum blocks. The rear edges of the cooking grates 36 are about 1.5 inches rearward of the rear edge of the emitter plate 34, and the rear edge of the emitter plate is about 0.5 inches rearward of the group of aluminum blocks. The right edge of the right cooking grate 36 is about 0.125 inches to the right of the right edge of the emitter plate 34, and the right edge of the emitter plate 34 is about 0.875 inches to the right of the group of aluminum blocks. The left edge of the left cooking grate 36 is about 0.125 inches to the left of the left edge of the emitter plate 34, and the left edge of the emitter plate 34 is about 0.875 inches to the left of the group of aluminum blocks. The stabilized temperature of the blocks were measured to determine the infrared energy distribution, and the stabilized temperatures, which are in degrees Fahrenheit, are respectively indicated on the blocks in FIG. 12. The measurements were made with an infrared pyrometer and with a thermocouple. The rate that the energy is transferred to the blocks is directly related to the flux density of the infrared energy.

Figure 13:
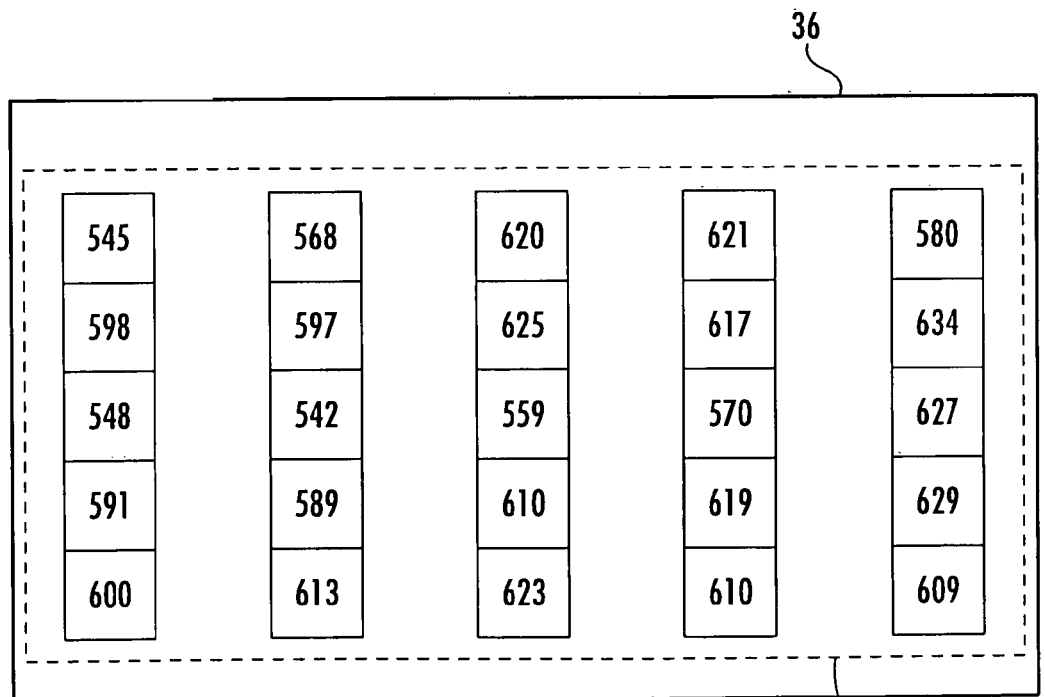
FIG. 13 is a schematic top plan view of heated blocks upon a portion of the compound heater of a second version of the first embodiment, in accordance with a second operational example.

A second operational example was identical to the first operational example, except that the baffles 70, 72 were removed. FIG. 13 is like FIG. 12, except that FIG. 13 is for the second operational example. For example, for FIG. 13, the stabilized temperature of the blocks were measured to determine the infrared energy distribution, and the stabilized temperatures, which are in degrees Fahrenheit, are respectively indicated on the blocks in FIG. 13. A comparison of the first and second operational examples (FIGS. 12 and 13) demonstrates that the baffles 70, 72 improve the performance of the conversion of convective energy to infrared energy. For the first and second operational examples, FIGS. 12 and 13 schematically illustrate that the distribution of the infrared energy at the plane of the grids 36 on which the food is placed is substantially uniform.

Third and fourth operational examples are respectively like the first and second operational examples, except that another method was used to evaluate the efficiency of the conversion of convective energy to infrared energy. The method used for the third and fourth operational examples is described in the following. A calorimeter consisting of a tray with a bottom having the same dimensions (in a top plan view) as the emitter plate 34 was fabricated. The calorimeter tray had a depth of four inches, a length of 22 inches, and a width of 11 inches. The bottom of the calorimeter tray was coated with a high emissivity coating having an emissivity of 0.94. A predetermined amount of water was placed in the calorimeter tray with the accurate weight recorded for both the water and the calorimeter tray. The initial temperature of the water and the calorimeter tray was also recorded. The calorimeter tray was then placed on the cooking grids 36 so that the calorimeter tray was centered over the emitter plate 34 with the emitter plate fully heated by the compound heater 76 having been and continuing to operate at high fire. The temperature of the water (after mixing) was recorded with time. The average energy delivered to the water in one minute was determined and the energy delivered to both the water and the calorimeter tray was calculated using the following heat transfer equation:

$$Q = W_{Cp}(T_2 - T_1)(60)$$

Q=BTU/Hr
W=weight of $H_2O$
$T_2$=Final Temp (One Min. Avg.)
$T_1$=Initial Temp
Cp=Specific Heat-Constant Pressure For the third operational example, the initial weight and temperature of the water were 10 pounds and 73° F., and after one, two and three minutes the temperatures of the water were 88° F., 102° F. and 115° F., respectively, for an average change in temperature in one minute of 14.13° F. Using the above heat transfer equation, it was calculated that total heat transfer rate was 9,789.9 BTU/HR (i.e., the calculated heat transfer rate to the water was 8,478 BTU/HR, and the calculated heat transfer rate to the calorimeter tray was 1,311.9 BTU/HR), for a calculated efficiency of 44.4%. The efficiency for the fourth operational example was determined in the same manner, and the efficiency for the fourth operational example was about 10 percent less than the efficiency of the third operational example, due to the baffles 70, 72 having been removed for the fourth operational example.

As best understood with reference to FIGS. 8-11 and in accordance with a variation of the first embodiment, the inner channel 124 and the covers 142 may be omitted from the burner 32. When the inner channel 124 and the covers 142 are omitted, the lower faces of the flanges 137, 138 of the outer channel 126 are in opposing face-to-face contact with the upper surface of the base plate 128.

In accordance with another variation of the first embodiment, the rows of air inlets 92 are respectively included in the front and rear walls 74, 106 of the burner housing 30, rather than in the bottom wall 96 of the burner housing. In this variation, any insulation 75 is configured so as not to unduly interfere with the flow of the secondary air 90, and the secondary air flows toward the burner 32 by way of flowing through the gaps between the lower edges of the baffles 70, 72 and the bottom wall 96 of the burner housing 30.

The first embodiment has been described thus far in the context of there being a single compound heater 76 in the grill 20. However, there may be two or more compound heaters 76 (e.g., arranged side by side) in the same grill 20. Even though the compound heaters 76 in the same grill 20 would be in close proximity to one another, typically each of the compound heaters 76 would be relatively isolated from one another in some ways. For example, each of the compound heaters' combustion chambers 80 would typically have its own, independent supply of fuel and air. When multiple burners are required, especially in a grill, then typically multiple combustion chambers respectively containing the burners would be used. For example and not limitation, it would somewhat defeat the purpose of the present design if multiple, separately supplied burners were used in a single combustion chamber because when some of the burners were not in use during operation, the secondary air available to the burners not in use could severely dilute the products of combustion of the burner in use. If multiple, separately controlled burners are used within a single combustion chamber, then the supplies of secondary air for the burners may be segregated/controlled, in an effort to restrict supplying too much secondary air when one of the burners is not operating. For example, such segregating and/or controlling of the secondary air may be achieved through the use of baffles, partitions, dampers or other suitable structures, in an effort to prevent secondary air for an unused burner from diluting the products of combustion of a burner in use. Notwithstanding the foregoing, it is within the scope of the present invention for multiple, separately controlled burners to be used within a single combustion chamber without segregating/controlling the supplies of secondary air to restrict supplying too much secondary air when one of the burners is not operating.

In accordance with variations to the first embodiment, the burner 32 may be replaced with other burners. For example, the burner 32 may be replaced with a conventional port-type convection burner, and the burner can be circular, square, rectangular or other shapes. Replacing the burner 32 with a conventional port-type convection burner may be suitable in some applications. However, in more demanding applications, replacing the burner 32 with a conventional port-type convection burner may result in failure of the conventional port-type convection burner. These failures may result from the gas-air mixture within the conventional burner reaching the auto ignition temperature of the fuel, so that "flash back" occurs.

FIGS. 14-16 illustrate a second embodiment of this disclosure. The first and second embodiments are alike, except for variations noted and variations that will be apparent to one of ordinary skill in the art. Accordingly, references numerals for features of the second embodiment that are at least generally like corresponding features of the first embodiment are incremented by two hundred. As one example of how the first and second embodiments are alike, the compound heater 276 of the second embodiment may be incorporated into the grill 20 in place of the compound heater 76 of the first embodiment. As one example of how the first and second embodiments differ, the second embodiment does not include baffles that correspond to the front and rear baffles 70, 72 of the first embodiment.

FIG. 14 is a schematic, isolated, top plan view of a burner assembly that includes a burner housing 230, tubular burner 232, air injector 262 and control valve 264 mounted to the burner housing by way of a mounting bracket 266, in accordance with the second embodiment. FIG. 15 is a schematic, partially cut away, front elevation view of the burner assembly of the second embodiment in combination with an emitter plate 234. In FIG. 15, the front wall 274 (FIG. 16) of the burner housing 230 is cut away to show the burner 232 within the burner housing. FIG. 16 is a schematic cross-sectional view of the compound heater 276, with the cross-section taken substantially along line 16-16 in FIG. 14. The emitter plate 234 together with the burner housing 230 forms a combustion chamber 280 of the compound heater 276.

Acceptable methods of operating the compound heater 276 are described in the following, in accordance with the second embodiment of this disclosure. During operation of the compound heater 276, the combustion chamber 280 contains the flames 282 and convective products of combustion 284, so that the emitter plate 234 is heated and emits infrared radiation.

A mixture of combustible gas and primary air is supplied to the flames 282 from the discharge ports 288 of the burner 232. The secondary air 290 enters the interior of the combustion chamber 280 by way of intake ports 292 of the combustion chamber 80, and the secondary air 290 mixes with the other contents of the combustion chamber by way of free convection, to at least partially facilitate the combustion within the combustion chamber. The convective products of combustion 284 exit the combustion chamber 280 by way of exhaust ports 286 of the combustion chamber.

Figure 17:
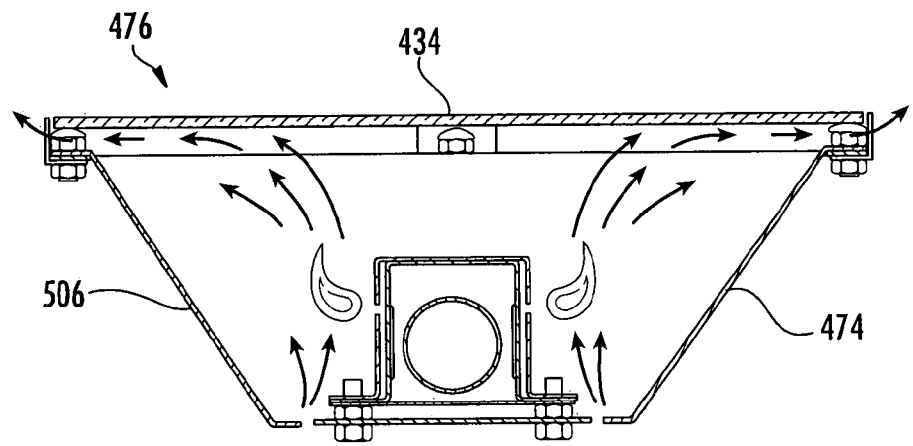
FIG. 17 is a schematic cross-sectional view of a compound heater, in accordance with a third embodiment of this disclosure.

As should be apparent from the foregoing, the baffles 70, 72 of the first embodiment may be omitted. As an example, when the baffles 70, 72 are omitted, the shape of the burner housing may be modified in an effort to at least partially compensate for the elimination of the baffles 70, 72. For example, FIG. 17 is a cross-sectional view that corresponds to the cross-sectional view of FIG. 4, except that FIG. 17 illustrates a third embodiment of this disclosure. The first and third embodiments are alike, except for variations noted and variations that will be apparent to one of ordinary skill in the art. Accordingly, references numerals for features of the third embodiment that are at least generally like corresponding features of the first embodiment are incremented by four hundred. As one example of how the first and third embodiments are alike, the compound heater 476 of the third embodiment may be incorporated into the grill 20 in place of the compound heater 76 of the first embodiment. As one example of how the first and third embodiments differ, the third embodiment does not include baffles that correspond to the front and rear baffles 70, 72 of the first embodiment. In accordance with the third embodiment, the front and rear walls 474, 506 of the burner housing 430 extend downwardly convergently with respect to one another, and they extend obliquely to the emitter plate 434 in order to at least partially compensate for the elimination of the baffles 70, 72.

Figure 18:
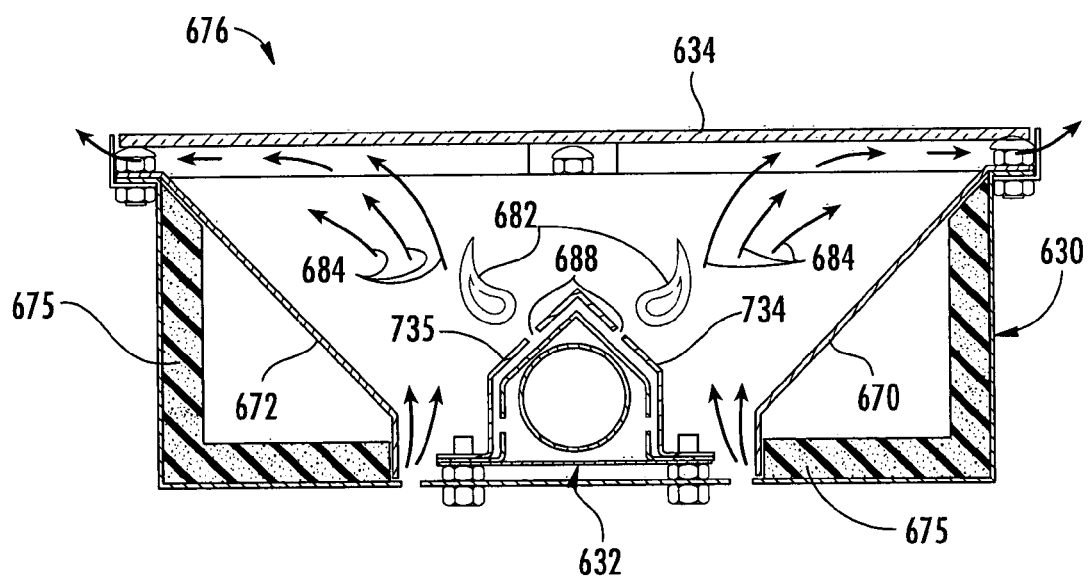
FIG. 18 is a schematic cross-sectional view of a compound heater, in accordance with a fourth embodiment of this disclosure.

FIG. 18 is a cross-sectional view that corresponds to the cross-sectional view of FIG. 4, except that FIG. 18 illustrates a fourth embodiment of this disclosure. The first and fourth embodiments are alike, except for variations noted and variations that will be apparent to one of ordinary skill in the art. Accordingly, references numerals for features of the fourth embodiment that are at least generally like corresponding features of the first embodiment are incremented by six hundred. As one example of how the first and fourth embodiments are alike, the compound heater 676 of the fourth embodiment may be incorporated into the grill 20 in place of the compound heater 76 of the first embodiment.

In accordance with the fourth embodiment, the burner's discharge ports 688 are respectively positioned in forward and rearward walls 734, 735 of the burner 632 that extend obliquely with respect to, and are in opposing face-to-face relation with, the lower surface of the emitter plate 634. That is, the top of the burner 632 is angled to influence the direction in which the flames 682 and convective products of combustion 684 flow. The insulation 675 shown between the baffles 670, 672 and the burner housing 630 in FIG. 18 is optional.

A fifth embodiment of this disclosure is like the first embodiment, except for variations noted and variations that will be apparent to one of ordinary skill in the art. Accordingly, references numerals for features of the fifth embodiment that are at least generally like corresponding features of the first embodiment are incremented by eight hundred. As one example of how the first and fifth embodiments are alike, the compound heater 876 of the fifth embodiment may be incorporated into the grill 20 in place of the compound heater 76 of the first embodiment.

Figure 19:
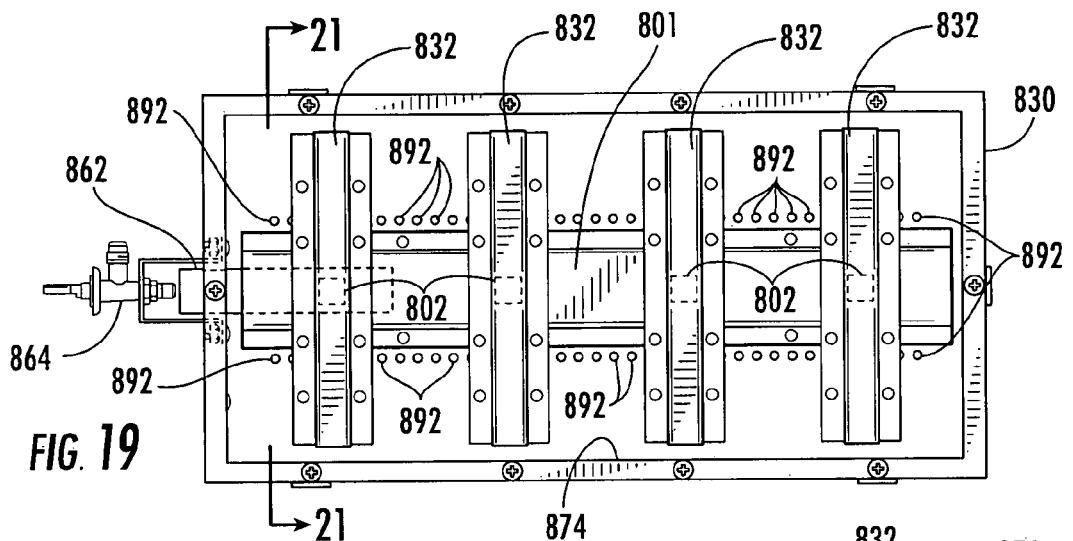
FIG. 19 is a schematic, isolated, top plan view of a burner assembly, in accordance with a fifth embodiment of this disclosure.

FIGS. 19-22 illustrate portions of the fifth embodiment in which a compound burner includes multiple burner segments 832 in which the discharge ports 888 are located. FIG. 19 is a schematic, isolated, top plan view of a burner assembly that includes a burner housing 830, the compound burner, air injector 862 and control valve 864. The combustible gas-air mixture is supplied to the interior of a tubular supply plenum 801 of the compound burner by way of the air injector 862. In FIG. 19, dashed lines schematically illustrate the air injector 862 extending into the compound burner's plenum. The supply plenum 801 is closed except for an opening where the air injector 862 enters it and openings 802 between the burner segments 832 and the supply plenum. The openings 802 are hidden from view in FIG. 19, but they are schematically illustrated by dashed lines. The supply plenum may be mounted to the burner housing 830 in the same manner in which the burner 32 of the first embodiment is mounted to the burner housing 30 of the first embodiment.

Figure 20:
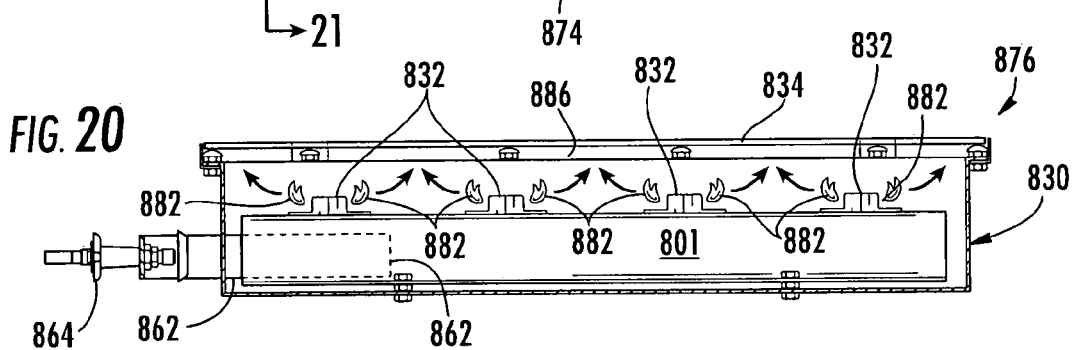
FIG. 20 is a schematic, partially cutaway, front elevation view of a compound heater of the fifth embodiment.

FIG. 20 is a schematic, partially cut away, front elevation view of a compound heater 876 (i.e., the burner assembly in combination with the emitter plate 834). In FIG. 20, the front wall 874 of the burner housing 830 is cut away to show the burner within the burner housing. Dashed lines schematically illustrate the air injector 862 extending into the burner's plenum in FIG. 20.

Figure 21:
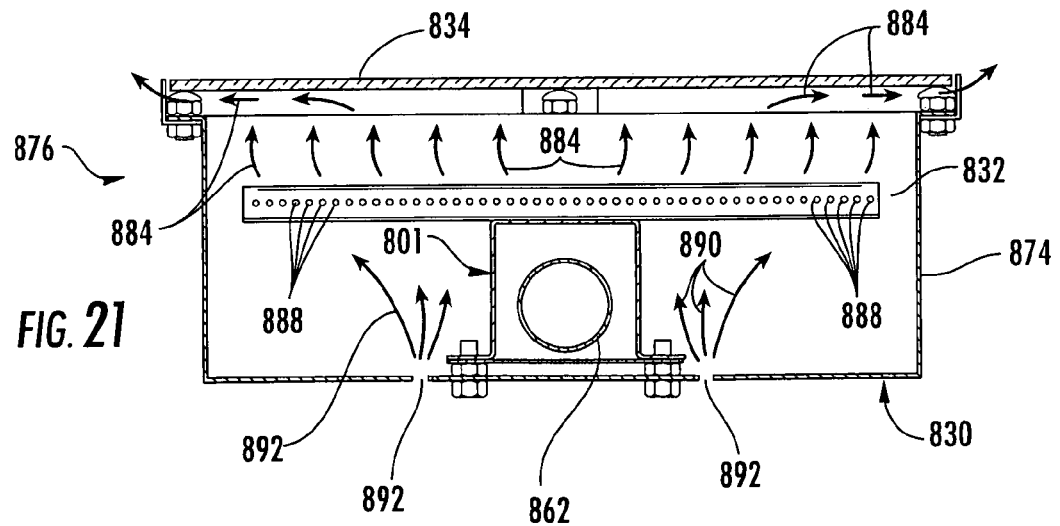
FIG. 21 is a schematic cross-sectional view of the compound heater of the fifth embodiment, with the cross-section taken substantially along line 21-21 in FIG. 19.
Figure 22:
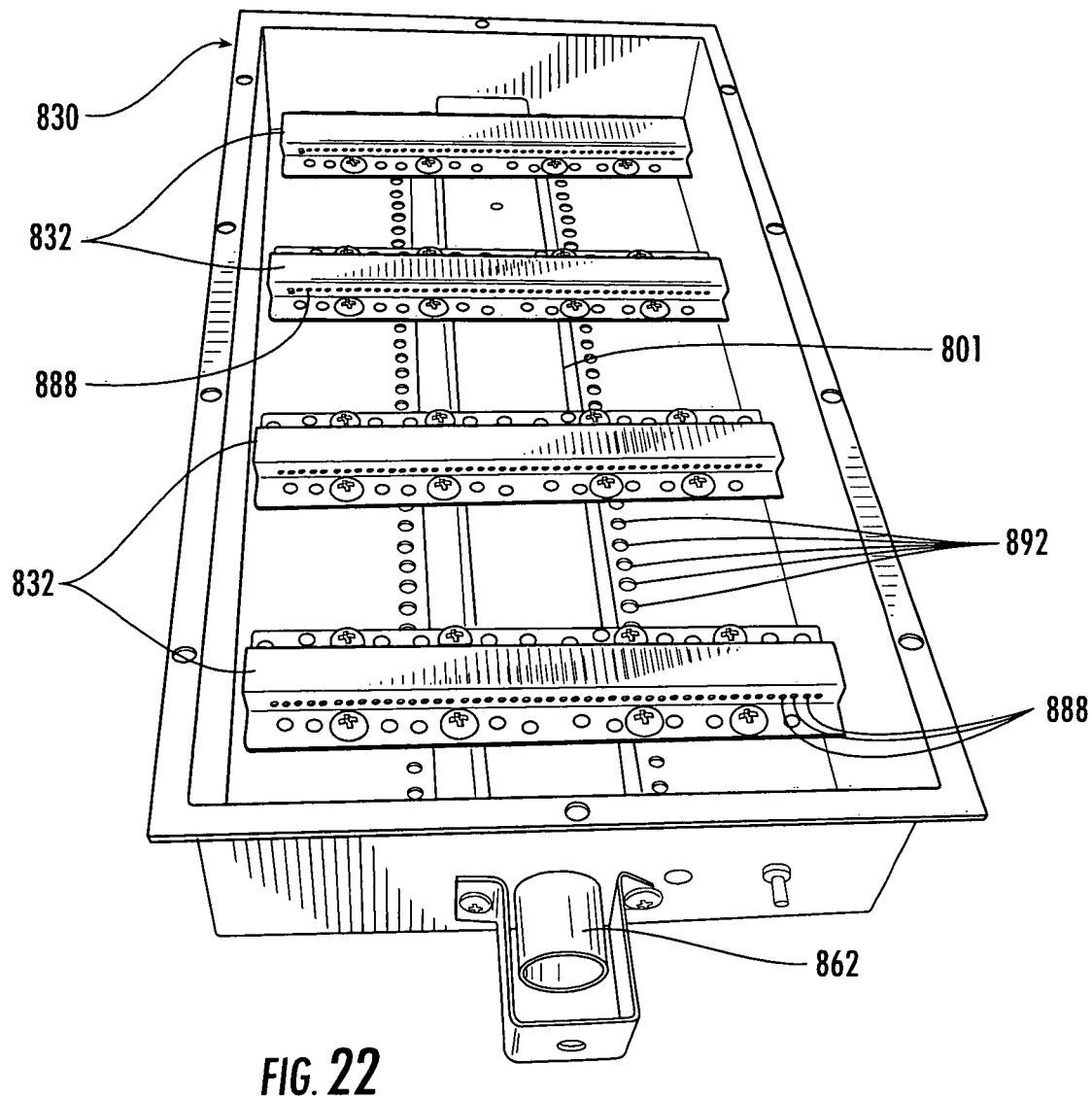
FIG. 22 is a left, top perspective view of a portion of the burner assembly shown in FIG. 19.

FIG. 21 is a schematic cross-sectional view of the compound heater 876, with the cross-section taken substantially along line 21-21 in FIG. 19. FIG. 22 is a perspective view of a portion of the burner assembly shown in FIG. 19.

Each of the burner segments 832 may be like the burner 32 of the first embodiment, including the variations/alternate embodiments described for the burner 32 of the first embodiment, except that both of the opposite end plates that close the opposite ends of the burner segments 832 lack openings/fully close the ends of the burner segments 832, and the inner plenums (e.g., see inner plenum 152 of FIG. 9) of the burner segments are in fluid communication with the supply plenum 801 by way of the openings 802 of the burner segments that are schematically shown in FIG. 19.

The burner's supply plenum 801 supplies the gas-air mixture to the multiple laterally extending burner segments 832, which are mounted to the supply plenum, by way of the supply openings 802. That is, each of the burner segments 832 is downstream from/supplied from the same control valve 864 and air injector 862.

The gas-air mixture is supplied to the flames 882 from the discharge ports 888 of the burner segments 832. The secondary air 890 enters the interior of the combustion chamber 880 by way of intake ports 892. The convective products of combustion 884 exit the combustion chamber 880 by way of exhaust ports 886.

The burner segments 832 may be arranged in different configurations. For example, another embodiment, portions of which are shown in FIGS. 23-25, is like the fifth embodiment, except for variations noted and variations that will be apparent to one of ordinary skill in the art. FIGS. 23-25 are respectively like FIGS. 19-21, except that in FIGS. 23-25, rather than having four parallel burner segments 832, there is a first pair of the burner segments 832a that are parallel to one another, and a second pair of the burner segments 832b that are parallel to one another and perpendicular to the first pair of the burner segments 832a. The burner's supply plenum 801' supplies the gas-air mixture to the pair of laterally extending burner segments 832a that are mounted to the plenum. The interiors of the laterally extending burner segments 832a are in fluid communication with the interior of the supply plenum by way of the supply openings 802 schematically shown in FIG. 23. The pair of longitudinally extending burner segments 832b is mounted to the laterally extending burner segments 832a so that the ends of the longitudinally extending burner segments 832b are respectively open to, and in fluid communication with, the ends of the laterally extending burner segments 832a. Each of the burner segments 832a, 832b is downstream from/supplied from the same control valve 864 and air injector 862.

The burner segments 832a, 832b together form a rectangular compound burner that extends around a central area of the interior space of the combustion chamber 880. Only a few of the flames 882 are schematically shown in FIGS. 23 and 25. Each of the burner segments 832a, 832b includes a series of discharge ports 888 extending along its opposite sides so that the flames 882 emanate from proximate the opposite sides. Accordingly, an inner series of discharge ports 888 of the burner extend around, and discharge into, the central area of the interior space of the combustion chamber 880; and an outer series of discharge ports 888 of the burner extend around the central area of the interior space of the combustion chamber 880 and discharge into a peripheral area of the interior space of the combustion chamber.

The design and shape of the burner(s) can influence the energy distribution. For example, a rectangular or square shaped burner may help simplify the distribution of the convective energy delivered to the underside of the emitter plate 834. In wider burners such as the rectangular burner, more energy is directed toward the outer edges of the emitter plate 834, and less toward the center of the emitter plate. That is, a wide variety of different arrangements are within the scope of this disclosure. For example, the arrangement of the discharge ports can vary from burner to burner depending on where the energy is desired to be concentrated on to the underside of the emitter plate.

Each of the above-discussed emitter plates 34, 234, 434, 634, 834 may be a solid plate of a high temperature type of glass that does not have holes extending through the plate. (Alternatively, an emitter plate, or the like, may have holes extending therethrough (e.g., see FIG. 28)). Such glass emitters typically do not expand or contract to a significant extent during heating and cooling. This eliminates the possibility of warping of the emitter surface. However, for the emitters, any material can be used that will withstand temperatures up to the maximum design temperature for use (e.g., in a grill), has good radiation qualities (e.g., an emissivity above about 0.7), and the strength necessary for the application. Typically each of the emitters of the above-discussed embodiments will have an emissivity of above about 0.7 irrespective of what they are made of. For example and not limitation, the emitters of the above-discussed embodiments may be glass coated metal, ceramic coated metal, ceramic, ceramic tiles, and oxidized metal (e.g., the oxidizing may be facilitated, at least in part, by sand blasting the surface of the metal).

In accordance with the above-discussed embodiments, each of the above-discussed emitter plates 34, 234, 434, 634, 834 is planer (e.g., substantially planar) and has an emitting surface (e.g., the upper surface) that is planar (e.g., substantially planar). Alternatively, the emitting surfaces may be irregular (e.g., undulating) and/or the overall shape of the emitters (e.g., emitter plates) may be irregular (e.g., undulating).

Figure 26:
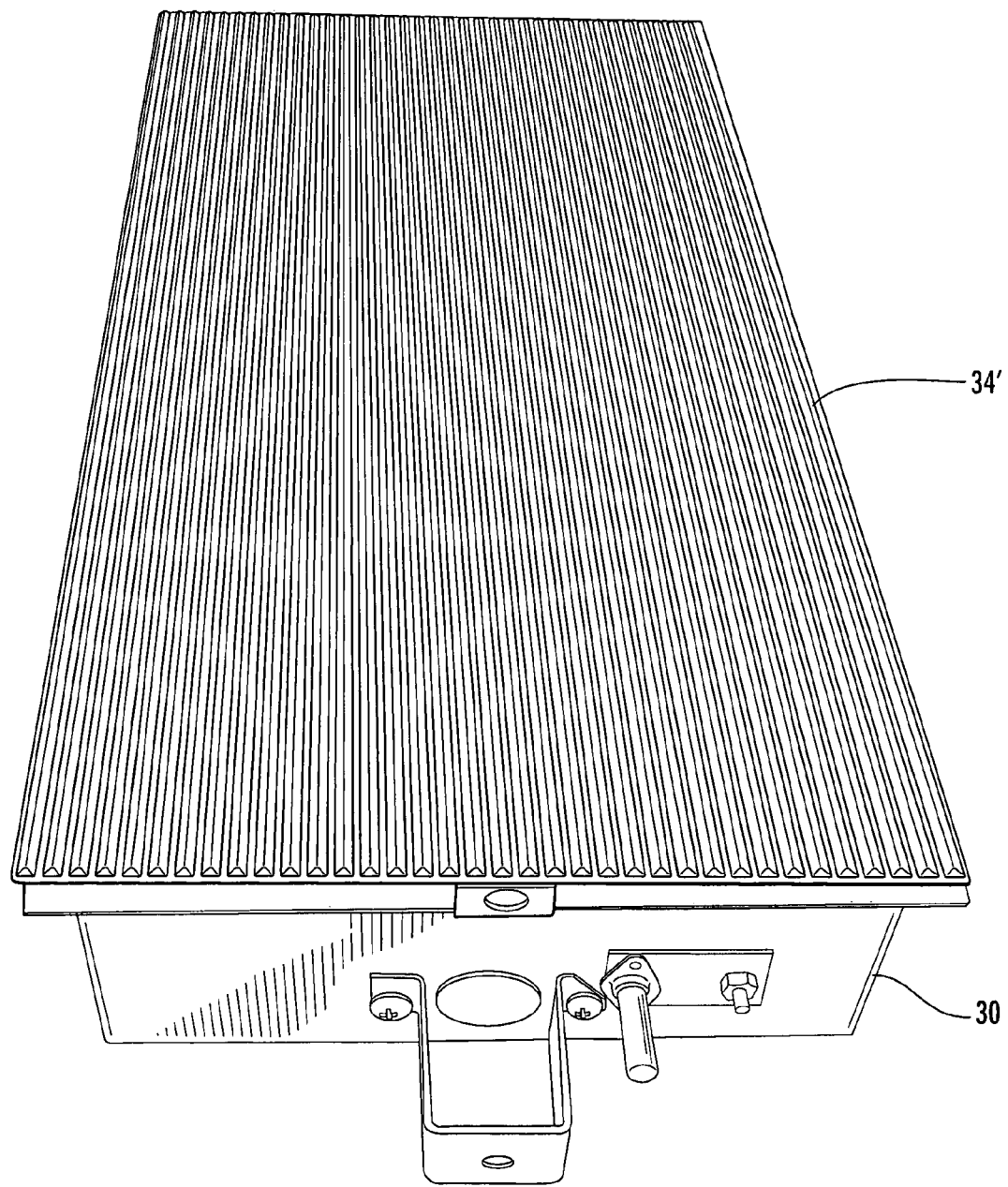
FIG. 26 is a left, top perspective view of a portion of a compound heater, with the emitter plate having an upper surface defining somewhat of a ribbed, undulating shape, in accordance with another embodiment of this disclosure.

For example, FIG. 26 is a perspective view of a solid glass, upwardly ribbed emitter plate 34' being used in place of the emitter plate 34 of the first embodiment, in accordance with an alternative embodiment. That is, the lower surface of the marginal area of the ribbed emitter plate 34' rests upon supports (e.g., the upper surfaces of the heads of the bolts 114 or any other suitable supports) so that the lower surface of the ribbed emitter plate 34' is suspended above and in opposing face-to-face relation with the burner housing 30, burner 32 and baffles 70,72 (if present). The elongate upper ridges or protrusions of the ribbed emitter plate 34' are typically formed by a series of elongate V-shaped sections in the upper surface of the ribbed emitter plate 34'. When the emitter surface is formed from the series of V-shaped sections, the emitted infrared energy can become more diffuse and uniform. The indentations in the emitter surface can also add strength to the ribbed emitter plate 34' and help eliminate warping of the emitter surface. These indentations may be convex or concave in shape and form.

Figure 27:
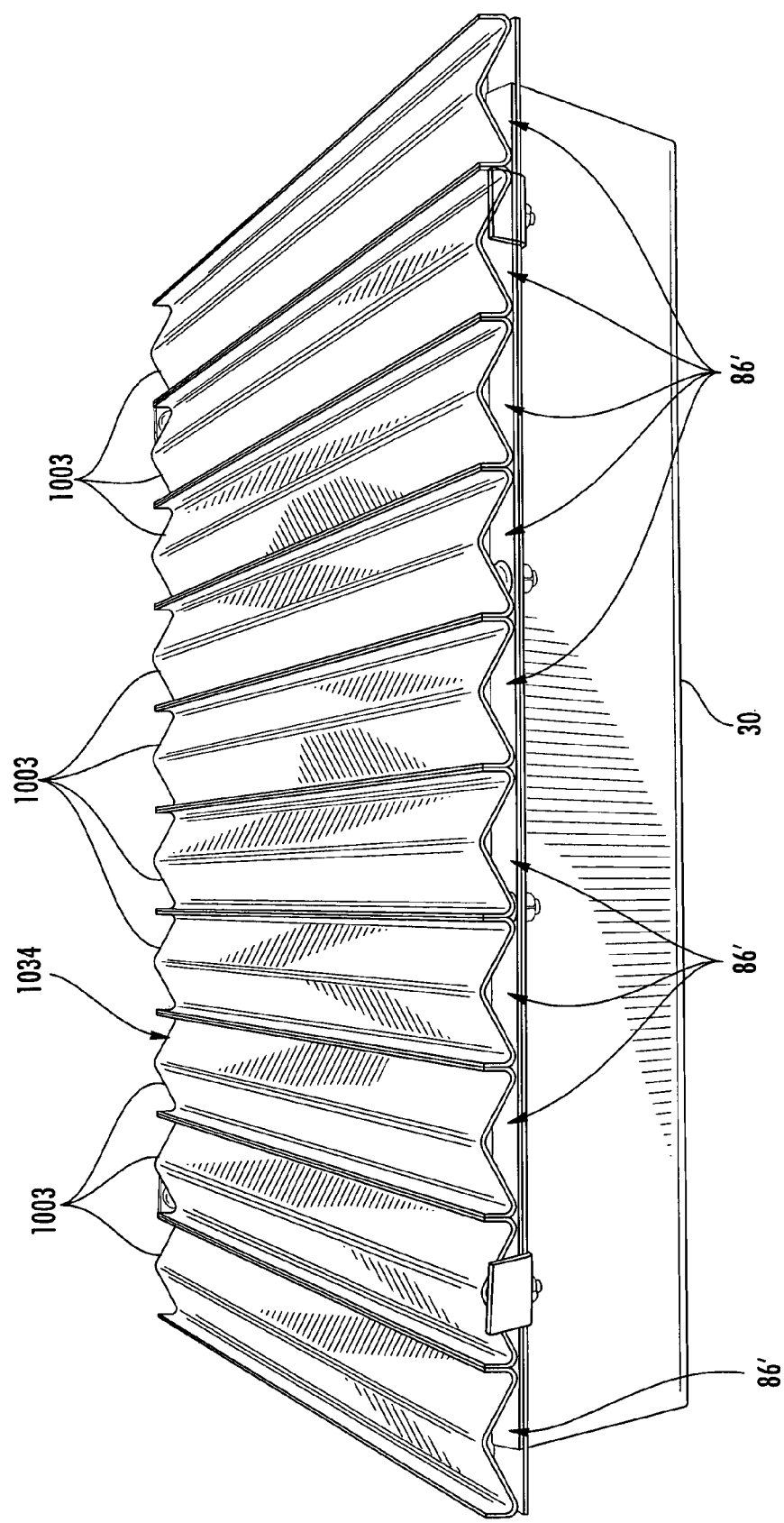
FIG. 27 is a front, top perspective view of a portion of a compound heater that includes an emitter having an undulating shape, in accordance with another embodiment of this disclosure.

As another example, FIG. 27 is a perspective view of an emitter 1034 that has an undulating shape and is being used in place of the emitter plate 34 of the first embodiment, in accordance with another alternative embodiment. The undulating emitter 1034 may be formed from a series of generally W-shaped, elongate emitter members 1003 that are arranged side by side. The lowest points of the undulating emitter 1034, at the opposite ends of each of the members 1003, may rest (i.e., be supported) directly upon the upper flanges of the baffles 70,72 (or the burner housing's flange 110 if the baffles 70,72 are not present). Therefore, the gaps between the upper/gable-shaped portions of the undulating emitter 1034 and upper flanges of the baffles 70,72 (or the burner housing's flange 110 if the baffles 70,72 are not present) define the exhaust ports 86'. The highest points of the undulating emitter 1034 may support the cooking grids 36, with the grids of the cooking grids 36 extending perpendicular to the elongate members 1003 of the undulating emitter 1034. Rather than the undulating emitter 1034 being formed from a series of elongate members 1003 that are arranged side by side, the undulating emitter 1034 may be a unitary part that is absent of separable pieces.

Each of the above-discussed emitters (e.g., emitter plates) preferably (e.g., optionally) does not have any holes that extend all the way through the emitter, so that the products of combustion in the combustion chambers may not flow through the emitter; and each of the above-discussed exhaust ports is configured to direct the gasses exhausted from the combustion chamber away from the food being cooked (e.g., broiled) on the cooking grates. That is, the emitting surface is typically solid (without apertures). The hot exhaust gasses are typically directed away from the food being cooked because the hot, dry exhaust gases, if exposed to the food, will remove more moisture during the cooking process than infrared energy emitted at long wavelengths. Dry, hot exhaust gases are an efficient vehicle for absorbing moisture. An aspect of this disclosure is to direct the hot exhaust gases away from the food, and to cause the transfer of the energy to the food to be in the form of infrared energy from the emitter (e.g., emitter plate) with 85% or more of the energy being at wavelengths greater than 3 microns.

It is also within the scope of this disclosure for the food to be cooked by a combination of convection, conduction and infrared radiation. Any convection will tend to remove more moisture from the food but it is within the scope of this disclosure to improve the design and performance of convective and radiant type grills by having apertures in the emitting surface (e.g., emitting plates) through which some hot exhaust gases can pass. In these alternative embodiments, the food is cooked from a mixed source of energy (e.g., a combination of convective and infrared energy). While these alternative embodiments may not be the most preferred embodiments, the concept of decreasing excess air in combination with producing infrared energy for cooking the food is an improvement over conventional grills.

Figure 28:
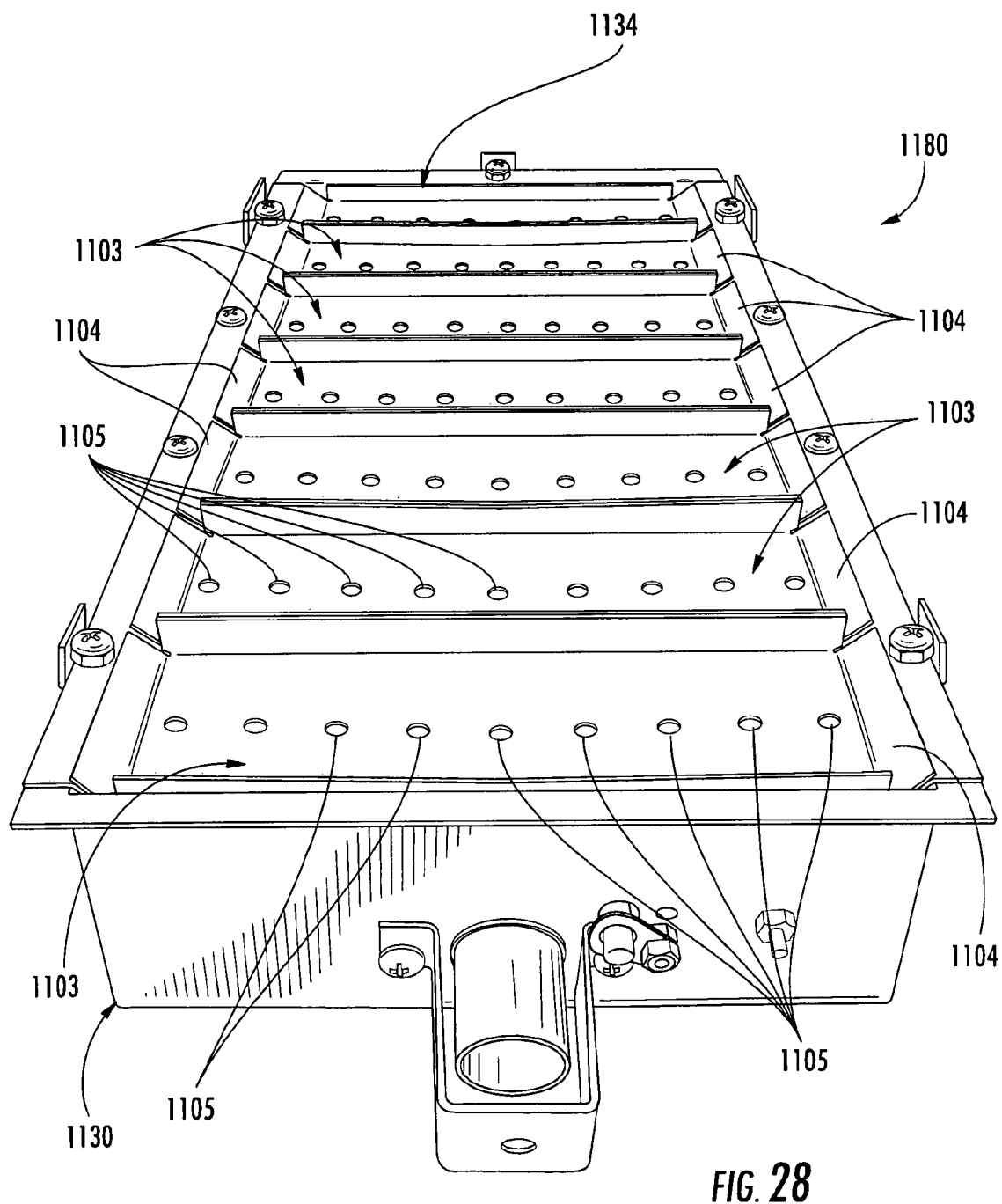
FIG. 28 is a left, top perspective view of a portion of a compound heater with an apertured emitter, in accordance with another embodiment of this disclosure.

As another example, FIG. 28 is a perspective view of an apertured emitter 1134 being used in place of the emitter plate 34 of the first embodiment, in accordance with another alternative embodiment. The apertured emitter 1134 may be formed from a series of generally U-shaped elongate members 1103 that are arranged side by side. As one example, oblique flanges 1104 of the elongate members 1103/at the opposite ends of the elongate members may rest (i.e., be supported) directly upon the oblique portions of the baffles 70,72. The oblique flanges 1104 of the elongate members 1103 obstruct the 86 exhaust ports/the 86 exhaust ports are not defined. Therefore, the holes 1105 (e.g., exhaust holes and/or exhaust perforations) in the elongate members 1104 define the exhaust ports for the combustion chamber 1180, and the exhaust gasses are directed to the food supported on the cooking grids 36 that overlie the apertured emitter 1134. In some situations, some of the flames within the combustion chamber 1180 may extend through the holes 1105. The cooking grids 36 may be spaced apart from the apertured emitter 1134 by several inches, or in any other suitable position. The apertured emitter 1134 may be a unitary part that is absent of separable pieces.

In contrast to the substantially open nature of the cooking grids 36, typically the holes 1105 in the apertured emitter 1134 are small enough and/or small enough in number so that the apertured emitter substantially covers (e.g., at least substantially obstructs) the upper opening of the burner housing 1130. For example, the holes 1105 in the apertured emitter 1134 may occupy a relative small percentage of the apertured emitter, such as but, not limited to, less than about 40%, less than about 30%, less than about 20%, less than about 10%, less than about 5%, or less than about 2.5% of the apertured emitter. Other configurations are also within the scope of the present invention.

For example and not limitation, it may be advantageous to use an apertured emitter 1134 or other non-solid emitters in applications where food is not being cooked (although solid emitters may also be used in such applications), such as in applications where items and/or coatings (e.g., paint, and the like) are to be heated (e.g., dried), in which case the cooking grids may be omitted or replaced with whatever type of devices might be useful for supporting the items to be heated. That is, the present invention is not limited to applications in which food is to be cooked (i.e., features of the present invention may have a wide range of uses that are not intended to be limited to the examples provided in this disclosure).

Whereas it may be preferred in most of the embodiments of this disclosure for the emitting surface to be solid (without apertures), in variations of each of the disclosed embodiments the emitting surface can include apertures through which the hot exhaust gases can flow out of the combustion chamber to the plane of the food. Regardless of how the hot exhaust gases are discharged from the combustion chamber, it is within the scope of this disclosure for the exhaust ports, exhaust holes, exhaust perforations, or the like, as well as other features to be configured so that the static gauge pressure within the combustion chamber (e.g., immediately under the emitter plate and, therefore, outside of the burner) is neutral (e.g., zero inches of water column) or at least substantially neutral during operation (e.g., high fire), as discussed above. More specifically and in accordance with one acceptable method of operation, regardless of how the hot exhaust gases are discharged from the combustion chamber, it is within the scope of this disclosure for the exhaust ports, exhaust holes, exhaust perforations, or the like, as well as other features to be configured so that the static pressure within the combustion chamber (e.g., immediately under the emitter plate and, therefore, outside of the burner) is substantially the same as the pressure (e.g., ambient atmospheric pressure) in which the combustion chamber is located, as discussed in detail above.

In accordance with one aspect of this disclosure, the cooking apparatus are operated so that the radiant energy (flux density) delivered to the plane of the surface on which the food is placed/that the food is exposed to is about 2,000 BTU/HR/FT$^2$, with nearly 100% of the energy used for cooking being the form of infrared energy (i.e., the convective energy/exhaust gasses are diverted away from the food). The temperature of the emitter at this desired level of infrared energy will produce infrared energy where more than 85% of the energy is emitted at wavelengths longer than 3 microns. That is and in accordance with one aspect of this disclosure, hot exhaust gasses are directed away from the food being cooked and the transfer of the energy to the food is in the form of infrared energy with 85% or more of the energy at wavelengths greater than 3 microns. Nonetheless, in some embodiments, the hot exhaust gasses are directed toward the food being cooked, even though this may slow the cooking process and tend to dry the food being cooked.

It will be understood by those skilled in the art that while the present disclosure has been discussed above with reference to exemplary embodiments, various additions, modifications and changes can be made thereto without departing from the spirit and scope of the following claims.

What is claimed is:

1. A method for providing infrared radiation, comprising:
   at least partially containing convective products of combustion in an interior space of a chamber that comprises an infrared emitter, so that a first side of the infrared emitter is
   in opposing face-to-face relation with the interior space of the chamber, and contacted by, and heated by, convective products of the combustion that are in the interior space of the chamber, so that the infrared emitter is heated to a substantially stabilized operating temperature; and
   providing secondary air to the combustion in a manner so that the convective products of the combustion that contact and heat the first side of the infrared emitter within the interior space of the chamber are at least about 100° F. hotter than the substantially stabilized operating temperature of the infrared emitter while the infrared emitter is at the stabilized operating temperature.

2. The method according to claim 1, comprising exhausting convective products of the combustion from the chamber, wherein the exhausting of the convective products of the combustion and the providing of the secondary air are carried out so that the convective products of the combustion that are being exhausted from the chamber are at least about 100° F. hotter than the substantially stabilized operating temperature of the infrared emitter while the infrared emitter is at the stabilized operating temperature, and the substantially stabilized operating temperature of the infrared emitter is at least about 400° F.

3. The method according to claim , further comprising cooking food, including arranging the food in opposing face-to-face relation with a second side of the infrared emitter so that the second side of the infrared emitter emits infrared radiation toward the food and the food is heated by way of at least some of the infrared radiation emitted from the second side of the infrared emitter.

4. An apparatus for cooking food with infrared radiation generated from convective products of combustion, wherein combustible gas, primary air and secondary air are supplied to the combustion, the apparatus comprising:
   a housing at least partially defining an interior space, wherein the interior space is for at least partially containing each of the combustion, the convective products of the combustion, and a mixture of the combustible gas, the primary air and the secondary air, wherein the housing includes an opening to the interior space;
   at least one burner in fluid communication with the interior space for providing a mixture of the combustible gas and the primary air to the combustion;
   an infrared emitter having opposite first and second sides, wherein
   the first side of the infrared emitter at least partially obstructs the opening to the interior space, at least partially defines the interior space and is in opposing face-to-face relation with the interior space, so that the first side of the infrared emitter is for being exposed to, and heated by, the convective products of the combustion in the interior space, and the second side of the infrared emitter is for emitting infrared radiation; and a support member positioned for supporting the food at a location in which the food is cooked by at least some of the infrared radiation emitted by the second side of the infrared emitter, wherein the infrared emitter is positioned between the interior space and the support member, wherein the apparatus is configured so that excess air present in gasses exhausted from the housing is less than 300% while the burner is operating, and the apparatus further comprises an exhaust port positioned between the housing and the first side of the infrared emitter, wherein the apparatus is configured so that excess air present in gasses exhausted from the housing by way of the exhaust port is less than 300%, while the burner is operating.

5. The apparatus according to claim 4, wherein: the housing includes a peripheral flange that extends around and at least partially defines the opening to the interior space; and the exhaust port is partially defined by each of the peripheral flange and the first side of the infrared emitter.

6. The apparatus according to claim 4, wherein:
the housing includes a plurality of upright walls that extends around and at least partially defines the interior space;
upper edges of the upright walls at least partially define a periphery of the housing that extends around and at least partially defines the opening to the interior space; and
the exhaust port is partially defined by each of the periphery of the housing and the first side of the infrared emitter.

7. An apparatus for cooking food with infrared radiation comprising:
a burner assembly comprising
a burner container having an upper end, a bottom, and an interior volume,
a burner element positioned within the burner container below the upper end thereof, the burner element having a plurality of discharge ports for discharging and burning a mixture of a combustible gas and primary air within the burner container, and
secondary air intake openings positioned within the burner container at an elevation lower than the discharge ports of burner element and
an infrared emitter positioned above the burner element such that convective products of combustion produced in the burner container will contact and heat a lower side of the infrared emitter,
wherein the interior volume and the secondary air intake openings of the burner container are sized such that, when exiting the upper end of the burner container, the convective products of combustion produced in the burner container will have an excess air content of less than 300% when the burner element is operated at from 50% to 100% of its full high fire capacity.

8. The apparatus of claim 7 wherein:
the burner element is a tubular burner;
a first row of the discharge ports extends along a right side of the tubular burner; and
a second row of the discharge ports extends along a left side of the tubular burner.

9. The apparatus of claim 7 wherein the secondary air intake openings are formed through the bottom of the burner container.

10. The apparatus of claim 7 wherein the burner element is positioned within a lower half of the interior volume of the burner container.

11. The apparatus of claim 7 wherein the interior volume and the secondary air intake openings of the burner container are sized such that, when exiting the upper end of the burner container, the convective products of combustion will have an excess air content of less than 250% when the burner is operated at from 50% to 100% of its full high fire capacity.

12. The apparatus of claim 7 wherein the interior volume and the secondary air intake openings of the burner container are sized such that, when exiting the upper end of the burner container, the convective products of combustion will have an excess air content of less than 200% when the burner is operated at from 50% to 100% of its full high fire capacity.

13. The apparatus of claim 7 wherein the interior volume and the secondary air intake openings of the burner container are sized such that, when exiting the upper end of the burner container, the convective products of combustion will have an excess air content of less than 150% when the burner is operated at from 50% to 100% of its full high fire capacity.

14. The apparatus of claim 7 wherein the interior volume and the secondary air intake openings of the burner container are sized such that, when exiting the upper end of the burner container, the convective products of combustion will have an excess air content of less than 100% when the burner is operated at from 50% to 100% of its full high fire capacity.

15. The apparatus of claim 7 wherein the interior volume and the secondary air intake openings of the burner container are sized such that, when exiting the upper end of the burner container, the convective products of combustion will have an excess air content of less than 50% when the burner is operated at from 50% to 100% of its full high fire capacity.

16. The apparatus of claim 7 further comprising:
a grill housing within which the burner assembly is installed and
a food support structure positioned above the infrared emitter.

* * * * *

UNITED STATES PATENT AND TRADEMARK OFFICE
CERTIFICATE OF CORRECTION

| | | |
|---|---|---|
| PATENT NO. | : 8,770,181 B2 | Page 1 of 1 |
| APPLICATION NO. | : 12/378689 | |
| DATED | : July 8, 2014 | |
| INVENTOR(S) | : Willie H. Best | |

It is certified that error appears in the above-identified patent and that said Letters Patent is hereby corrected as shown below:

In the Claims

Column 30, Line 39, Claim 3: The number 1 should be added after the word claim

Signed and Sealed this
Twenty-third Day of September, 2014

Michelle K. Lee
*Deputy Director of the United States Patent and Trademark Office*